US011181375B2

(12) United States Patent
Michini et al.

(10) Patent No.: US 11,181,375 B2
(45) Date of Patent: Nov. 23, 2021

(54) DYNAMICALLY ADJUSTING UAV FLIGHT OPERATIONS BASED ON THERMAL SENSOR DATA

(71) Applicant: Skydio, Inc., Redwood, CA (US)

(72) Inventors: Bernard J. Michini, San Francisco, CA (US); Fabien Blanc-Pâques, San Francisco, CA (US)

(73) Assignee: Skydio, Inc., Redwood City, CA (US)

( * ) Notice: Subject to any disclaimer, the term of this patent is extended or adjusted under 35 U.S.C. 154(b) by 0 days.

(21) Appl. No.: 15/636,871

(22) Filed: Jun. 29, 2017

(65) Prior Publication Data

US 2018/0004231 A1 Jan. 4, 2018

Related U.S. Application Data

(60) Provisional application No. 62/357,269, filed on Jun. 30, 2016.

(51) Int. Cl.

| | |
|---|---|
| ***G01C 21/00*** | (2006.01) |
| ***G06T 17/20*** | (2006.01) |
| ***G01C 21/20*** | (2006.01) |
| *B64C 39/02* | (2006.01) |

(52) U.S. Cl.

CPC ............. *G01C 21/00* (2013.01); *G01C 21/20* (2013.01); *B64C 39/024* (2013.01); *B64C 2201/127* (2013.01); *B64C 2201/141* (2013.01)

(58) Field of Classification Search

CPC .... G05D 1/101; G05D 1/0016; G05D 1/0022; H04W 24/04; G08G 5/04; B64C 39/024; G07C 5/08; G07C 5/085; G06T 7/00; G06T 17/20; G01C 21/20

See application file for complete search history.

(56) References Cited

U.S. PATENT DOCUMENTS

| | | | | |
|---|---|---|---|---|
| 9,439,092 | B1 * | 9/2016 | Chukka | H04W 24/04 |
| 9,545,995 | B1 * | 1/2017 | Chau | G05D 1/0022 |
| 9,658,619 | B1 * | 5/2017 | Bethke | G05D 1/102 |
| 2014/0303884 | A1 * | 10/2014 | Levien | G08G 5/04 701/301 |
| 2016/0093124 | A1 * | 3/2016 | Shi | B64D 47/08 701/2 |
| 2016/0304198 | A1 * | 10/2016 | Jourdan | B64C 39/024 |
| 2016/0343124 | A1 * | 11/2016 | Sundheimer | G06T 7/62 |
| 2017/0285627 | A1 * | 10/2017 | Feldmann | H04W 4/025 |
| 2020/0387940 | A1 * | 12/2020 | Freeman | H04N 13/275 |

* cited by examiner

*Primary Examiner* — Yuri Kan

(74) *Attorney, Agent, or Firm* — Young Basile Hanlon & MacFarlane, P.C.

(57) ABSTRACT

In some implementations, a UAV flight system can dynamically adjust UAV flight operations based on thermal sensor data. For example, the flight system can determine an initial flight plan for inspecting a flare stack and configure a UAV to perform an aerial inspection of the flare stack. Once airborne, the UAV can collect thermal sensor data and the flight system can automatically adjust the flight plan to avoid thermal damage to the UAV based on the thermal sensor data.

30 Claims, 14 Drawing Sheets

DYNAMICALLY ADJUSTING UAV FLIGHT OPERATIONS BASED ON THERMAL SENSOR DATA

CLAIM OF BENEFIT TO PRIOR APPLICATIONS

This application claims priority to U.S. Provisional Application Ser. No. 62/357,269, filed Jun. 30, 2016, the contents of which is incorporated by reference herein in its entirety.

TECHNICAL FIELD

The disclosure generally relates to automatically piloting unmanned aerial vehicles.

BACKGROUND

Unmanned aerial vehicles (UAVs) are becoming more widely used to perform tasks that are typically done by teams of people. For example, UAVs are used for inspecting buildings, crops, erosion of rivers and coastlines, delivery of goods, and many other tasks. A task that UAVs might be particularly useful for is inspection of tall and/or dangerous structures. For example, a UAV might be particularly well-suited for inspecting (e.g., taking photographs and/or other sensor data) radio towers, flare stacks, and other tall objects that are difficult for people to inspect without risking human life. However, UAV's can often be expensive and damaging a UAV during an inspection mission can cost the UAV operator a lot of money in repairs and lost flight time.

SUMMARY

In some implementations, a UAV flight system can dynamically adjust UAV flight operations based on thermal sensor data. For example, the flight system can determine an initial flight plan for inspecting a flare stack and configure a UAV to perform an aerial inspection of the flare stack. Once airborne, the UAV can collect thermal sensor data and the flight system can automatically adjust the flight plan to avoid thermal damage to the UAV based on the thermal sensor data.

Implementations described herein provide at least the following advantages. A UAV can perform inspections of dangerous objects without risking human life. The UAV can automatically avoid damage to the UAV by deviating from an initial flight plan to avoid areas of high heat. The UAV can collect sensor data that allows the UAV operator to inspect an object even when the object is obscured by smoke and/or other airborne particulates.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

System Overview

Figure 1:
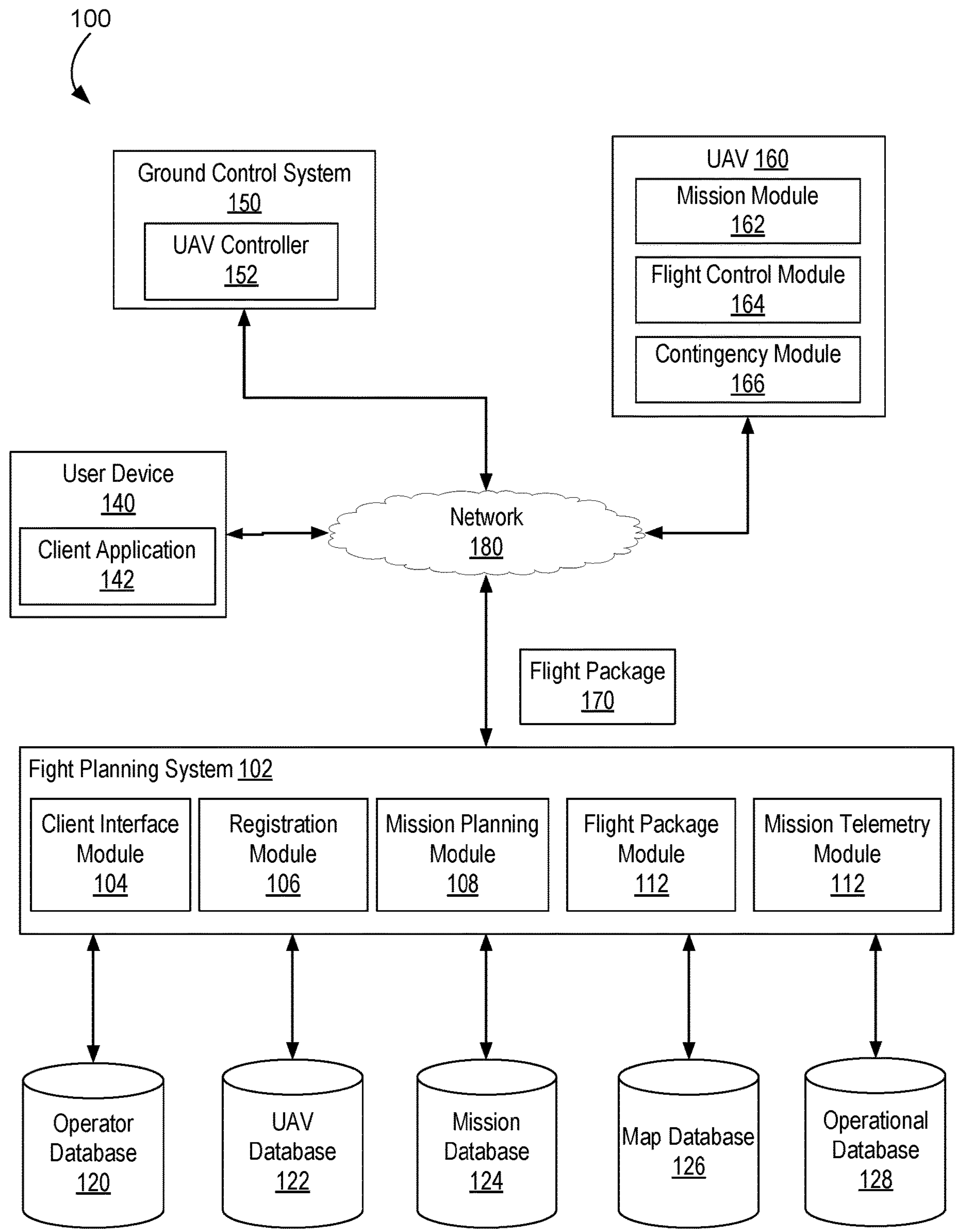
FIG. 1 is a block diagram of an example UAV flight system.

FIG. 1 is a block diagram of an example unmanned aerial vehicle (UAV) flight system 100. For example, UAV flight system 100 can be a system of various computing devices, databases, and UAVs that include hardware and software configured to perform, control, and manage UAV flight operations. System 100 can be configured, as needed, to perform mission-specific flight operations in support of a mission-specific goal, such as aerial inspection and/or aerial delivery.

In some implementations, system 100 can include flight planning system 102. For example, flight planning system 102 can be a system of one or more computers, and/or software executing on a system of one or more computers for planning and/or controlling the operation of one or more unmanned aerial vehicles. Flight planning system 102 can be a system of one or more processors, graphics processors, logic circuits, analog circuits, associated volatile and/or non-volatile memory, associated input/output data ports, power ports, etc., and/or one or more software processing executing one or more processors or computers. The flight planning system 102 may receive, store, generate, and maintain flight operation information associated with a UAV, UAV operators and/or UAV missions using various software modules (e.g., modules 104-112).

In some implementations, flight planning system 102 can include client interface module 104. For example, client interface module 104 can provide client interfaces for UAV operators to interact with flight planning system 102. The UAV operator can, for example, interact with client software application 142 on user device 140 (e.g., a laptop computer, desktop computer, tablet computer, etc.) to connect to client interface module 104 of flight planning system 102 through network 170 to register with flight planning system 102, to submit flight requests and/or mission requests, and/or to receive flight packages, including mission-specific flight plans and/or UAV programming.

For example, network 180 can be a wide area network, local area network, wireless network, cellular network, and/or the Internet. Network 180 can be a peer-to-peer (e.g., ad-hoc) network implemented using near field communication technologies such as Bluetooth, peer-to-peer Wi-Fi, and/or other wireless peer-to-peer networking technologies. In some implementations, network 180 can represent a wired peer-to-peer connection, such as a universal serial bus (USB) connection between the devices connected to network 180. For example, flight planning system 102, user device 140, or ground control system 150 may connect to one or more UAVs 160 through network 180 using a wired (e.g., USB, Ethernet, etc.) or wireless (e.g., Wi-Fi, Bluetooth, etc.) connection to configure or program the UAVs 160 to fly a mission, as described further below. Flight planning system 102, user device 140, and/or ground control system 150 may connect to each other through network 180 using a wired (e.g., USB, Ethernet, etc.) or wireless (e.g., Wi-Fi, Bluetooth, etc.) connection to exchange mission requests, flight approvals, flight packages, and/or other information, as described further below.

In some implementations, client application 142 can be a web browser and client interface module 112 can be a web server. For example, client interface module 112 can send web client user interfaces (e.g., web pages, HTML, JavaScript, etc.) to client application 142 so that the UAV operator can enter information into the web client interfaces describing the UAV operator, the UAV operated by the UAV operator, and/or the mission the UAV operator would like to fly.

In some implementations, client application 142 can be a native client (e.g., built specifically for the operating system or hardware configuration of user device 140) and client interface module 112 can be a server that exchanges data with client application 142 using standard network protocols. For example, client application 142 can establish a communication session with so that the UAV operator can enter information into a graphical user interface of client application 142 describing the UAV operator, the UAV operated by the UAV operator, and/or the mission the UAV operator would like to fly and client application 142 can send the information to client interface module 104 for processing by flight planning system 102.

In some implementations, flight planning system 102 can include registration module 106. For example, before a UAV operator can fly a UAV mission using flight system 100, a UAV operator can register with flight planning system 102 through registration module 106. For example, when the UAV operator registers with flight planning system 102 using client application 142, the UAV operator can provide input to client application 142 describing UAV operator information, including an identifier for the UAV operator (e.g., a company identifier, a pilot identifier, etc.), licensing information (e.g., UAV pilot's license or certification), contact information (e.g., contact person, telephone number, address, etc.), and/or any flight restrictions for the UAV operator (e.g., regional restrictions, UAV size restrictions, UAV type restrictions, altitude restrictions, etc.). In some implementations, the UAV operator information can include identification (e.g., registration number, make, model, serial number, type, etc.) of each the UAVs that the UAV operator intends to fly. Client application 142 can send the UAV operator information to registration module 106 (e.g., through client interface module 104). Upon receipt of the UAV operator information, registration module 106 can store the UAV operator information in operator database 120. The UAV operator information stored in UAV operator database 120 may include different or additional UAV operator information, as may be described herein below.

In some implementations, flight planning system 102 (e.g., registration module 106) can store UAV information in UAV database 122. For example, UAV database 122 can include records for each UAV operated (e.g., flown) by system 100. UAV database 122 can be populated with UAV information provided by UAV operators (e.g., during registration) using client application 142 and client interface module 104, for example.

In some implementations, UAV configuration database 122 can be populated by flight planning system 102 based on data received from UAV manufacturers and/or various network resources (e.g., manufacturer's servers, UAV operator servers, etc.) For example, when a UAV operator submits a registration request, a mission request, or a flight request to flight planning system 102, the UAV operator can identify one or more UAVs that will be used to perform flight missions. Flight planning system 102 can obtain (e.g., from network resources, from the UAV operator, etc.) the specifications for the identified UAV and store the UAV specifications in UAV database 122. A UAV record in UAV database 122 can include an identifier for the UAV. For example, the UAV identifier can be a registration number assigned to the UAV by a governmental agency (e.g., the Federal Aviation Administration) or an identifier assigned to the UAV by flight planning system 102. The UAV record can include information describing the specifications of the UAV, such as make, model, serial number, configuration type (e.g., multirotor, fixed wing, etc.), weight, payload capacity, top speed, maximum altitude, maximum range, contingency features (e.g., parachute) and/or other UAV specifications, as may be described herein.

In some implementations, flight planning system 102 can include mission planning module 108. For example, mission planning module 108 can determine mission parameters, including flight plans and/or other mission parameters, based on mission requests (e.g., flight requests) submitted by a UAV operator through client interface module 104 using client application 142. For example, the mission parameters specified in the mission request can include the type of mission (e.g., inspection, delivery), the target of the mission (e.g., a specific building, location, infrastructure element, natural feature, etc.), a flight plan, a description of the UAV performing the mission, and/or other mission parameters. When the mission parameters are received, flight planning system 102 can store the mission parameters in mission database 124.

In some implementations, mission planning module 108 can generate mission parameters based on a received mission request. For example, while a mission request submitted by a UAV operator may include a full definition of the mission parameters for the requested mission (e.g., type of mission, mission target, flight plan, UAV designation, etc.), some mission requests may not include full definition of the mission parameters required for the requested mission. For example, some mission requests may only define the type of mission and the mission target. When a mission request does not provide a full definition of the mission parameters for the mission, mission planning module 108 can automatically determine the missing mission parameters for the mission. For example, when the UAV operator provides a mission request that only identifies the mission type, mission target, mission timeframe, and UAV designation, mission planning module 108 can automatically determine a flight plan that will allow the designated UAV to perform the identified mission type with respect to the mission target in the identified mission timeframe. For example, if the mission type is an inspection mission, mission planning module 108 can determine a flight path that allows the UAV to inspect the mission target (e.g., a building) within the identified mission timeframe. For example, if the mission type is a delivery mission, mission planning module 108 can determine a flight path that allows the UAV to make a delivery to the mission target (e.g., address) within the identified mission timeframe.

In some implementations, mission planning module 108 can automatically determine flight paths for requested missions based on data stored in map database 126. For example, map database 126 can include map data, including geospatial descriptions (e.g., location, configuration, size, dimensions, height, layout, etc.) of objects that might be the subject of a UAV mission. For example, the objects may include natural features (e.g., geological features, geographical features, etc.) and/or man-made features (e.g., buildings, pipelines, bridges, radio towers, flare stacks, etc.). Mission planning module 108 can use the map data to determine flight paths for inspecting the objects described by the map data, making a delivery to the objects described by the map data, and/or avoiding the objects described by the map data so that the UAV does not crash into the objects while in flight.

In some implementations, the map data stored in map database 126 can be received from UAV operators in mission requests. For example, when a UAV operator submits a mission request to mission planning module 108, the request can include map data describing the target of the requested mission. Mission planning module 108 can store the received map data in map database 126. Alternatively, mission planning module 108 can obtain the map data for the object identified as the mission target in a mission request from one or more network resources (e.g., various Internet services, a map vendor, etc.). Mission planning module 108 can store the obtained map data in map database 126.

In some implementations, mission planning module 108 can store the mission parameters for each flight mission request in mission database 124. For example, the mission parameters can include an identifier for a UAV performing the mission. If additional information about a UAV is needed, mission planning module 108 can look up UAV specifications and other data for the identified UAV in UAV database 122. The mission parameters can include an identifier for the UAV operator controlling the mission. If additional information about a UAV operator is needed, mission planning module 108 can look up the UAV operator information and other data for the identified UAV operator in operator database 120.

In some implementations, the mission parameters can include a flight plan. The flight plan can be defined by a UAV operator or automatically determined by mission planning module 108, as described above. For example, the flight plan can include a flight schedule that defines a start time (e.g., date and time), an end time (e.g., date and time), and/or a duration for the mission. The flight plan can include a flight path for each mission. For example, the flight path can include a take-off location, a landing location, and way points (e.g., geospatial locations, including latitude, longitude, altitude) for navigating between the take-off location and the landing location.

The flight plan can include one or more geofences that define geospatial areas that the UAV must stay within or stay outside of when flying the mission. For example, the flight plan can include a first geofence that defines a geospatial area (e.g., approved airspace) that the UAV must stay within while conducting the mission. The first geofence can, for example, define a geospatial area that contains the take-off location, landing location, and all waypoints defined for the flight plan. The flight plan can include a second geofence that defines a geospatial area (e.g., restricted airspace) that the UAV must not go within. For example, the second geofence can be generated to keep the UAV out of populated areas, military installations, and/or other protected areas (e.g., fuel storage sites, nuclear reactors, etc.).

The flight plan can include contingency data for the mission. For example, the contingency data can define contingency events (e.g., motor failure, control failure, deviation from flight path, exiting geofence, etc.) and maneuvers to perform in response to a detected contingency event (e.g., fly to emergency landing zones, follow emergency flight paths, deploy parachute, etc.).

In some implementations, the mission parameters can describe special payloads for the UAV to perform the mission. For example, the UAV operator can define special UAV payloads required for performing the UAV mission in the mission request received by mission planning module 108. For example, special payloads can include cameras, sensors, payload carrying apparatus, etc., configured on the UAV for performing a specific mission. For example, if the UAV mission is to perform a visual inspection of a natural disaster, then the special payload may include a high definition camera for taking pictures of the natural disaster. If the UAV mission is to detect thermal emissions, electromagnetic emissions, gas leaks, or other types of thermal, radiological, or chemical leaks, the special payload can include sensors for detecting thermal, radiological, or chemical leaks.

In some implementations, after determining the mission parameters for a mission request and storing the mission parameters in mission database 124, mission planning module 108 can determine whether the mission parameters conflict with other pending missions in mission database 124. For example, flight planning system 102 can be configured to manage the airspace needed for UAV missions. Therefore, after mission planning module 108 determines a flight plan for a requested mission, mission planning module 108 can determine whether the schedule for the requested mission conflicts with other flight missions that have flight plans in the same airspace at the same time as the requested mission. If no other missions are scheduled at the same time and same airspace as the requested mission, then mission planning module 108 can authorize the requested mission, reserve the necessary airspace, and indicate in the mission record in mission database 124 that the requested mission is approved and/or scheduled. If another mission is scheduled at the same time and same airspace as the requested mission, then mission planning module 108 can notify the requesting UAV operator (e.g., through client application 142) that the airspace needed for the requested mission is unavailable (e.g., has already been reserved) at the requested time and indicate in the mission record in mission database 124 that the requested mission is not approved and/or not scheduled. The UAV operator can then request an alternative time for the mission until an appropriate time for the requested mission is determined.

In some implementations, flight planning system 102 can include flight package module 112. For example, after mission planning module 108 determines the mission parameters for a received mission request and approves the requested mission, mission planning module 108 can send the mission parameters to flight package module 112 for packaging into flight package 170 for delivery to ground control system 150 and/or UAVs 160. For example, flight package 170 can include one or more flight plans. Each flight plan can include a flight schedule (e.g., start time, end time), start location, destination location, way points for navigating from the start location to the destination location, contingency event definitions, contingency maneuvers for each contingency event. Flight package 170 can include operator (e.g., pilot) information, such as the name of the operator, the operator's employer, the operator's license information (e.g., including UAV ratings), etc. Flight package 170 can include UAV information, such as the UAV type, payload, model, size, operating range, and/or other UAV specifications describing the UAV that will perform the mission described by the flight package. For example, a UAV operator can use UAV controller application 152 on ground control system 150 to program and/or control one or more UAVs 160 according to the data in flight package 170. Alternatively, flight planning system 102 can send flight package 170 directly to one or more UAVs 160 to program the UAVs 160 according to the flight package 170. UAVs 160 can then, in some implementations, automatically pilot themselves according to the flight plans and/or other data in flight package 170.

In some implementations, system 100 can include one or more UAVs 160. For example, UAV 160 can include mission module 162. For example, mission module 162 can process flight package 170 to determine the mission parameters for a scheduled mission or flight, including the flight plan, contingency conditions (e.g., events that trigger a contingency maneuver), and/or contingency maneuvers for the mission. Mission module 162 can, for example, determine the flight plan for the mission based on the flight plan data in flight package 170. Mission module 162 can send the flight plan (e.g., start location, way points, etc.) to flight control module 164.

In some implementations, UAV 160 can include flight control module 164. For example, flight control module 164 can use the flight plan data to cause UAV 160 to automatically navigate from a take-off location, to one or more waypoints, and to the landing location defined by the flight plan automatically based on data provided by various motion sensors and/or location subsystems of the UAV. For example, flight control module 164 can determine the current location of UAV 160 based on various wireless signals (e.g., global navigational satellite signals, radio access technology signals, Wi-Fi signals, etc.) and motion sensor data. Flight control module 164 can use the wireless signals and/or motion sensor data to determine the location of UAV 160 using well-known dead reckoning and/or trilateration techniques, for example. Flight control module 164 can compare the current location of UAV 160 to the location of the next way point in the flight plan received from mission module 166 to determine a heading along which UAV 160 should fly in order to reach the next way point. Flight control module 164 can perform this process periodically while in flight to adjust the heading of UAV 160 so that UAV 160 can travel to the next way point. For example, if UAV 160 is flying in an environment with a strong wind, flight control module 164 may need to adjust the heading of UAV 160 many times as it is blown around by the wind in order to reach the next way point.

In some implementations, mission module 162 can determine the contingency information for the mission based on the contingency conditions and corresponding contingency maneuvers defined in flight package 170. For example, each contingency event can be associated with a respective contingency maneuver that may be different than the contingency maneuvers for other contingency events. Some contingency conditions can be associated with the same contingency maneuver. For example, flight package 170 can describe a default contingency maneuver (e.g., land in designated safe zone) that can be triggered by multiple contingency events. Mission module 162 can send the contingency information to contingency module 166 so that contingency module 166 can monitor for contingency events and cause UAV 160 to execute contingency maneuvers.

In some implementations, UAV 160 can include contingency module 166. For example, contingency module 166 can receive contingency information from mission module 162. The contingency information can, for example, include geofence definitions for approved airspace and restricted airspace and contingency maneuvers to perform when UAV 160 exits approved airspace or enters restricted airspace. For example, contingency module 166 can use the current location of UAV 160 to automatically keep UAV 160 within approved airspace. For example, contingency module 166 can use the current location information to determine when UAV 160 exits a geofence that defines approved airspace. Contingency module 166 can use the current location of UAV 160 to determine when UAV 160 enters a geofence that defines restricted airspace, as described above.

In some implementations, when contingency module 166 detects a contingency event, contingency module 166 can automatically initiate a contingency maneuver. The contingency maneuver can be defined by flight package 170. The contingency maneuver can be a default contingency maneuver configured in contingency module 166. For example, when contingency module 166 detects that UAV 160 exits a geofence defining approved airspace (e.g., a contingency event) for the mission and/or when contingency module 166 detects that UAV 160 enters a geofence defining restricted airspace (e.g., a contingency event), the contingency module 166 can initiate a contingency manuever. For example, contingency module 166 can send contingency maneuver data to flight control module 162 to cause flight control module 164 to execute a contingency maneuver. For example, the contingency maneuver data can define a flight path for returning UAV 160 to an approved flight path, the contingency maneuver data can define a flight path to safely land UAV 160 at a location where UAV 160 can be safely recovered by the UAV operator, the contingency maneuver data can indicate that flight control module 162 should deploy a parachute, or perform some other contingency maneuver.

In some implementations, flight planning system 102 can include mission telemetry module 112. For example, mission telemetry module 112 can receive mission operational information, including aircraft operational data and/or mission-specific data collected and/or generated by UAVs 160 while performing a UAV mission. In some implementations, aircraft operational data can include the UAV's operational information, such as the UAV's precise three-dimensional location in space, velocity information, UAV status (e.g., health of components included in the UAV), executed contingency plans, and so on. Thus, the mission operational information can include a flight data log that stores changes in the aircraft operational data over time. In some implementations, the mission-specific data can include data generated by special or mission specific payload devices affixed to the UAV. For example, the mission-specific data can include still images, video feeds, sensor data, and/or other mission-specific data generated when inspecting a mission target and/or making a delivery to the mission target, as described above. When mission telemetry module 112 receives mission operational information, mission telemetry module 112 can store the mission operational information in operational database 128. For example, operational database 128 can include a record of each UAV mission managed by flight planning system 102, including the mission operational data received for each respective mission.

In some implementations, the ground control system (GCS) 150 may act as a user device for interacting with the flight planning system 102. For example, GCS 150 can include the functionality and features of user device 140. GCS 150 can be configured to communicate with and control (e.g., using UAV controller application 152) one or more UAVs 160 while the UAVs are in flight. For example, UAV controller application 152 can receive information from flight planning system 102 describing a UAV's flight through reserved airspace. For example, flight planning system 102 can receive (e.g., real-time) UAV location information and transmit the information to UAV controller application 152. UAV controller application 152 can present on a display of GCS 150 a time-based graphical representation of a flight through the reserved airspace based on the information received from flight planning system 102. A UAV operator can provide input to a graphical user interface of UAV controller application 152 to make adjustments to the UAV's flight in real-time. For example, the UAV operator may notice a problem with the aircraft or an obstruction in the airspace where the UAV is flying and command the UAV to initiate a contingency maneuver to safely land and/or avoid the obstruction in the airspace. Thus, UAVs may automatically pilot themselves based on the data in flight package 170 and/or the UAV operator may manually control UAVs 160 using UAV controller application 152 on GCS 150.

Figure 2:
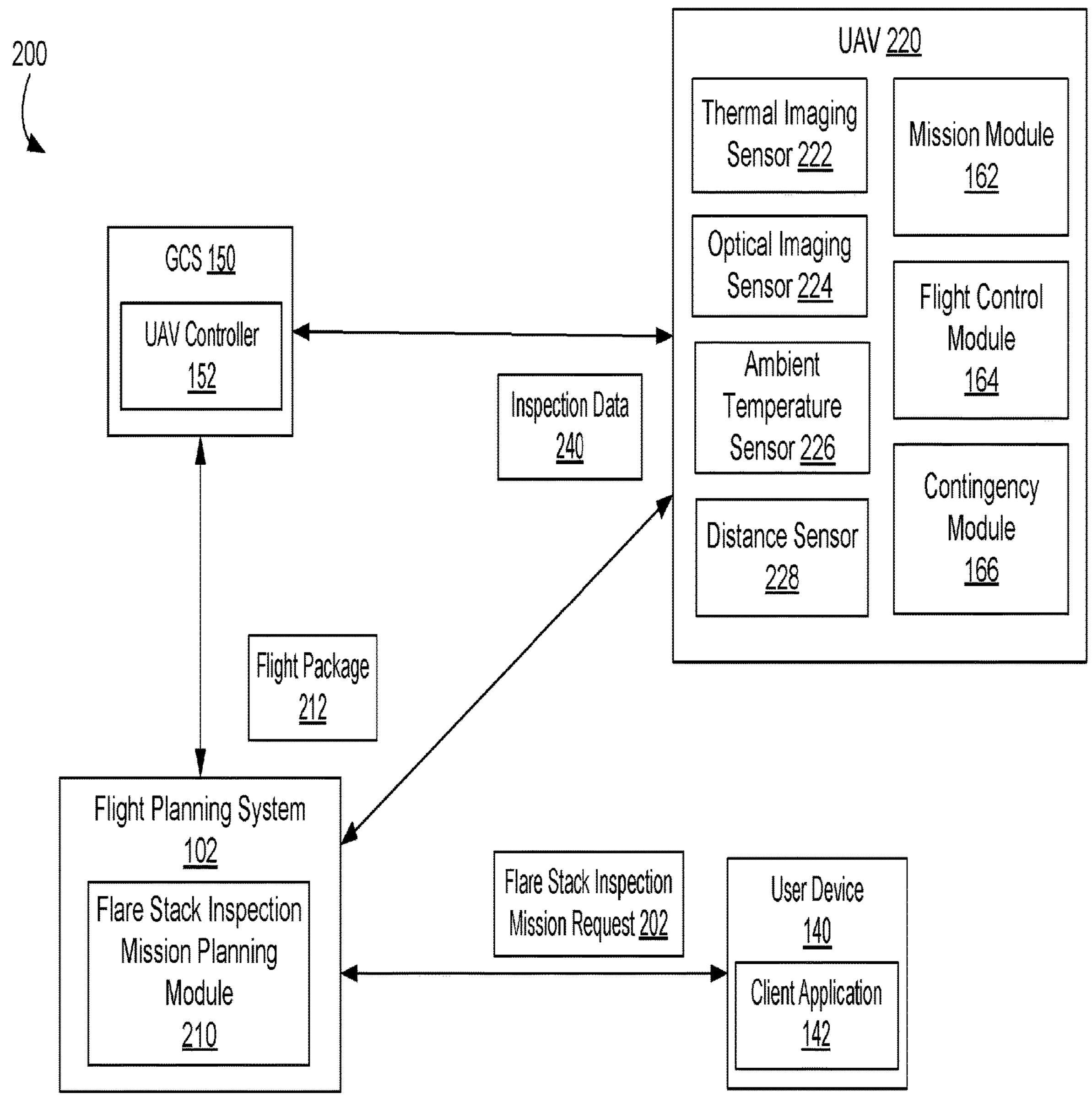
FIG. 2 is a block diagram of an example flight system for dynamically adjusting UAV flight operations based on thermal sensor data.

FIG. 2 is a block diagram of an example flight system 200 for dynamically adjusting UAV flight operations based on thermal sensor data. For example, system 200 can correspond to system 100 of FIG. 1. System 200 can be configured, for example, to fly UAV missions to inspect flare stacks (and/or other objects, structures, etc.) that generate heat that may damage a UAV. Flare stacks are commonly used in industrial plants (e.g., oil refineries, chemical plants, natural gas processing plants, etc.) to burn unwanted byproducts of manufacturing or to handle over pressurization events. It is essential that the flare stacks operate properly so that these industrial plants can operate efficiently and avoid shutdowns. Routine inspections and maintenance of these flare stacks allow manufacturers to make repairs according to a managed timeline and avoid unscheduled shutdowns that may cost the manufacturer a large sum of money.

Typically, inspections of flare stacks are performed by humans on the ground using telescopes and other devices to inspect the components of the flare stack (e.g., the nozzle, tip, etc.) for cracks, corrosion, and/or other damage. However, ground inspections are often not very effective. Inspections of the flare stack can be performed by a large team of people climbing the flare stack to look at the various components of the flare stack. However, in order for humans to get close enough to climb the flare stack, the flare stack must be shut down, which can cost the manufacture a large sum of money.

UAVs provide an opportunity for the manufacturer to inspect the flare stacks at relatively close range without incurring the cost of shutting down the flare stack. Additionally, UAVs can be configured with sensors that allow the UAV to capture optical images as well as thermal images of the flare stack that might reveal more details about the current state of the flare stack. However, UAVs are susceptible to damage caused by the extreme heat generated by the flare stacks. Thus, UAV flight system 200 can provide features and functionality that allow UAVs to avoid heat damage while improving the quality of flare stack inspections.

In some implementations, flight system 200 can include user device 140. As described above, user device 140 can include client application 142. A UAV operator can interact with client application 142 to generate and submit a UAV mission request as described above. For example, the UAV operator can interact with client application 142 to generate flare stack inspection mission request 202. The UAV operator can, for example, provide input to client application 142 defining the mission parameters specified in mission request 202, as described further below.

In some implementations, mission request 142 can specify mission parameters for the flare stack inspection mission. For example, the mission parameters can include an inspection target definition that defines or describes the object (e.g., flare stack, target object, etc.) to be inspected. The target definition can, for example, include a geographical location of the target. For example, the geographical location can correspond to the center of the object (e.g., the center of the flare stack). The target definition can include the dimensions of the target object. For example, the dimensions can include the height, width, radius, diameter, etc., of the target object. The target definition can, for example, include any other information required to generate a three-dimensional model (e.g., a 3D point cloud, digital surface model, surface mesh, etc.) of the target object. The target definition can include location data for points of interest on the target object. For example, the target definition can include coordinates, relative location data, etc., that identifies points of interest on the surface of the target object. Alternatively, the target definition can identify sections or areas of the target object to inspect. For example, the target definition can indicate that the entire target object is to be inspected or a particular portion (e.g., less than all) of the target object is to be inspected. In the case of a flare stack, the points of interest can include the nozzle or tip of the flare stack, critical portions of the support structure, fuel lines, the top half of the flare stack, and the like. The target definition can include a description of obstructions (e.g., guy lines, bracing, etc.). The target definition can include a description of outbuildings, pipelines, and/or other structures in the vicinity of the flare stack.

In some implementations, the target definition can be generated by the UAV operator, as described above. Alternatively, the target definition can be obtained by user device 140 or flight planning system 102 from the manufacturer or operator of the flare stack. For example, the UAV operator can provide input to client application 142 identifying the target object and/or the location of the target object (e.g., the flare stack), and client application 142 or flight planning system 102 can obtain the target definition from a server or other computing device associated with the manufacturer or operator of the flare stack based on the object identifier and/or location.

In some implementations, the mission parameters specified in mission request 204 can include no-fly zones for the target object. For example, the no-fly zones (e.g., geospatial or volumetric areas) can be specified in the target definition obtained from the flare stack manufacturer, as described above. The no-fly zones can be automatically generated by client application 142 and/or flight planning system 102 based on the obstructions identified in the target definition described above. The no-fly zones can be specified by the UAV operator by providing input describing the no-fly zones. For example, the UAV operator can provide input to a graphical user interface (e.g., a map display) of client application 142 that defines the no-fly zones around the target object.

In some implementations, the mission parameters specified in mission request 204 can include inspection parameters. For example, the inspection parameters can include specifications for the various sensors to be used on the UAV when conducting the aerial inspection of the target object (e.g., the flare stack). The inspection parameters can include specifications for an optical digital camera (e.g., optical imaging sensor 224), including the camera sensor size (e.g., megapixels), resolution, and/or the focal length of the camera. If the camera has an adjustable focal length (e.g., a zoom lens), then the focal length can include maximum and minimum focal length values for the camera. The inspection parameters can include specifications for a thermal imaging camera (e.g., thermal imaging sensor 222), including sensor size, resolution, and/or the focal length of the camera.

In some implementations, the inspection parameters can define the surface sampling distance required for the inspection. The surface sampling distance can, for example, be similar to ground sampling distance in that the surface sampling distance defines the amount of surface area that should be covered by a single pixel of the cameras described above (e.g., 1 mm per pixel, 3 mm per pixel, etc.). For example, flight planning system 102, GCS 150, and/or UAV 220 can use the required surface sampling distance, the camera sensor size (or resolution), and the focal length of the camera, to determine appropriate standoff distances for inspecting (e.g., capturing images of) the target object (e.g., the flare stack). For example, the standoff distance defines how far away from target object the camera can be (or must be) to capture an image (e.g., optical or thermal) having the required surface sampling distance. If the camera has an adjustable focal length (e.g., min-max), then the standoff distance can be defined as a range of values between a minimum and maximum distance.

In some implementations, the mission parameters can include a flight plan. For example, the UAV operator can provide input to client application 142 to specify a take-off location (e.g., starting location), a landing location (e.g., an ending location), and/or one or more way points for flying from the starting location to the ending location. For example, the way points can be selected to provide the UAV a vantage point from which to perform the inspection (e.g., capture images, sensor data, etc.) of the target object.

In some implementations, after receiving the mission parameters from the UAV operator and/or other resources, client application 142 can send flare stack inspection mission request 202, including the mission parameters, to flight planning system 102. For example, flight planning system 102 can receive mission request 202 and generate a flight plan for inspecting the target object (e.g., the flare stack) according to the mission parameters in mission request 202.

In some implementations, flight planning system 102 can include flight stack inspection mission planning module 210. For example, mission planning module 210 can correspond to mission planning module 108 of FIG. 1. Mission planning module 210 can plan the flare stack inspection mission based on mission request 202, for example. Mission planning module 210 can generate or obtain map data corresponding to target definition received in mission request 202. For example, mission planning module 210 can generate a three-dimensional model or map of the target object based on the target object location and target object dimensions information included in mission request 202. Mission planning module 210 can obtain a three-dimensional model or map of the target object from network resources (e.g., the flare stack manufacturer's server, the flare stack operator's server, etc.). If flight planning system 102 has previously generated a flight plan for the target object, mission planning module 210 can obtain a three-dimensional model or map of the target object from map database 126, as described above.

In some implementations, mission planning module 210 can generate a flight plan for inspecting points of interest on the target object specified in mission request 202. For example, if the UAV operator has specified a flight plan in mission request 202, mission planning module 210 can confirm that the operator-specified flight plan is suitable for inspecting the target object. If the UAV operator has not specified a flight plan in mission request 202, mission planning module 210 can automatically generate a flight plan for inspecting the target object. For example, mission planning module 210 can generate a flight plan that includes a take-off location, a landing location, and one or more way points that will allow UAV 220 to inspect the points of interest specified in mission request 202 while avoiding the obstructions and no-fly zones specified in the mission request and/or map data corresponding to the target object.

When mission request 202 specifies a portion of the target object to inspect, mission planning module 210 can automatically determine or generate points of interest on the target object based on the portion of the target object to be inspected and the sensor specifications specified in the mission request. For example, mission planning module 210 can determine points of interest on the flare stack such that after the camera captures an image of each point of interest, the entire portion of the target object has been captured in the images (e.g., optical images, photographic images, thermal images, etc.) generated by the camera. For example, mission planning module 210 can generate a flight plan that includes a take-off location, a landing location, and one or more way points that will allow UAV 220 to inspect the points of interest generated or determined by mission planning module 210 while avoiding the obstructions and no-fly zones specified in the mission request and/or map data corresponding to the target object.

In some implementations, mission planning module 210 can determine the way points based on sensor specifications (e.g., optical camera specifications, thermal camera specifications) and the required surface sampling distance specified in mission request 202. For example, mission planning module 210 can determine the stand-off distance or a range of stand-off distances for capturing images that achieve the required surface sampling distance, as specified in mission request 202. For example the stand-off distance (or range of stand-off distances) can be determined based on the specified surface sampling distance, the size of the camera sensor, and the focal length (or lengths) of the camera using well-known techniques. After the stand-off distance (or range of distances) is determined, mission planning module 210 can select way points that provide a view of the points of interest on the target object and that are located at a distance from their respective points of interest determined based on the stand-off distance or range of stand-off distances, as described further below.

In some implementations, mission planning module 210 can determine a flight plan based on thermal data associated with the target object. For example, when the target object is a flare stack, mission planning module 210 can obtain a default heat map for the area around the flare stack that describes or predicts the ambient temperature at different distances from the flare stack under normal or average operating conditions. For example, the heat map can predict or estimate the ambient heat distribution around the flare stack based on the flare stack processing a typical amount of material in fair weather conditions (e.g., not windy, not rainy, average sunshine, etc.). The default heat map can be predetermined based on specifications provided by the flare stack operator or manufacturer, for example. The default heat map can be obtained by mission planning module 210 from a network server operated by the flare stack operator or flare stack manufacturer, for example. The default heat map can be generated by mission planning module 210 based on radiant temperature data for the flare stack. For example, mission planning module can estimate the ambient temperature at various locations around the flare stack based on an estimate of the temperature generated by the flare stack under normal operating conditions.

In some implementations, mission planning module 210 can determine a minimum safe operating distance from the flare stack for the UAV. For example, mission planning module 210 can determine the safe ambient temperature threshold or range of temperatures (e.g., high threshold, low threshold) for the UAV (e.g., UAV 220) specified in mission request 202 (e.g., based on UAV specifications stored in UAV database 122). Mission planning module 210 can determine a minimum safe operating distance from the flare stack based on the heat map for the flare stack and the safe ambient temperature threshold(s) for UAV 220. Mission planning module 210 can adjust the determined flight plan to keep UAV 220 at a distance greater than the minimum safe operating distance. For example, mission planning module 210 can determine or specify way points that are at a distance away from the flare stack that is greater than the safe operating distance.

After mission planning module 210 determines or generates the flight plan for the requested inspection mission, mission planning module 210 can generate flight package 212 that includes the flight plan generated by mission planning module 210. For example, flight package 212 can include the flight plan, a geofence that defines airspace reserved for the flight plan, geofences that define no-fly zones (e.g., restricted airspace), map data that includes a 3D model of the target object (e.g., the flare stack), contingency event definitions and corresponding contingency maneuvers, and any other data required for flying the requested mission, as may be described herein.

For example, the contingency events for the flare stack inspection mission can include (e.g., in addition to geofence events) an ambient temperature threshold event that causes UAV 220 to execute a contingency maneuver that causes UAV 220 to move to a cool down distance away from the flare stack to cool off the UAV when the ambient temperature around UAV 220 exceeds the safe ambient temperature threshold value specified (e.g., predefined) for UAV 220, as described above. Another contingency event for the flare stack inspection mission can include a hardware temperature threshold event that causes UAV 220 to execute a contingency maneuver that causes UAV 220 to move to a cool down distance away from the flare stack to cool off the UAV when the internal temperature of a hardware component (e.g., motor, processor, etc.) of UAV 220 exceeds the safe internal temperature threshold value specified (e.g., predefined) for UAV 220, as described above. For example, UAV 220 can remain in a holding pattern at the cool down distance until the internal temperature of UAV 220 reaches a safe operating temperature.

Flight planning system 102 can then send flight package 212 to UAV controller application 152 on ground control system 152 and/or to UAV 220. In some implementations, UAV controller application 152 can send flight package 212 to UAV 220 to configure the UAV for the inspection mission.

In some implementations, flight system 200 can include UAV 220. For example, UAV 220 can correspond to UAV 160 of FIG. 1. UAV 220 can include mission specific hardware and/or software for performing the flare stack inspection described above. For example, UAV 220 can include thermal imaging sensor 222 (e.g., an infrared camera, thermographic camera, etc.). UAV 220 can include optical sensor 224 (e.g., a digital optical imaging camera). UAV 220 can include ambient temperature sensor 226 for detecting the ambient temperature around UAV 220 while in flight. UAV 220 can include distance sensor 228 (e.g., LIDAR) for determining the distance between UAV 220 and the inspection target object (e.g., the flare stack). When UAV 220 receives flight package 212 from flight planning system 102 or GCS 150, mission module 162 can configure UAV 220 to fly the inspection mission defined by flight package 212, as described above. For example, mission module 162 can send flight control 164 the flight plan so that flight control module 162 can navigation and/or control UAV 220 while in flight. Mission module 162 can send contingency module 166 the contingency data (e.g., contingency events, contingency maneuvers) from flight package 212 so that contingency module 166 can monitor for contingency events and trigger contingency maneuvers as described above.

Figure 3:
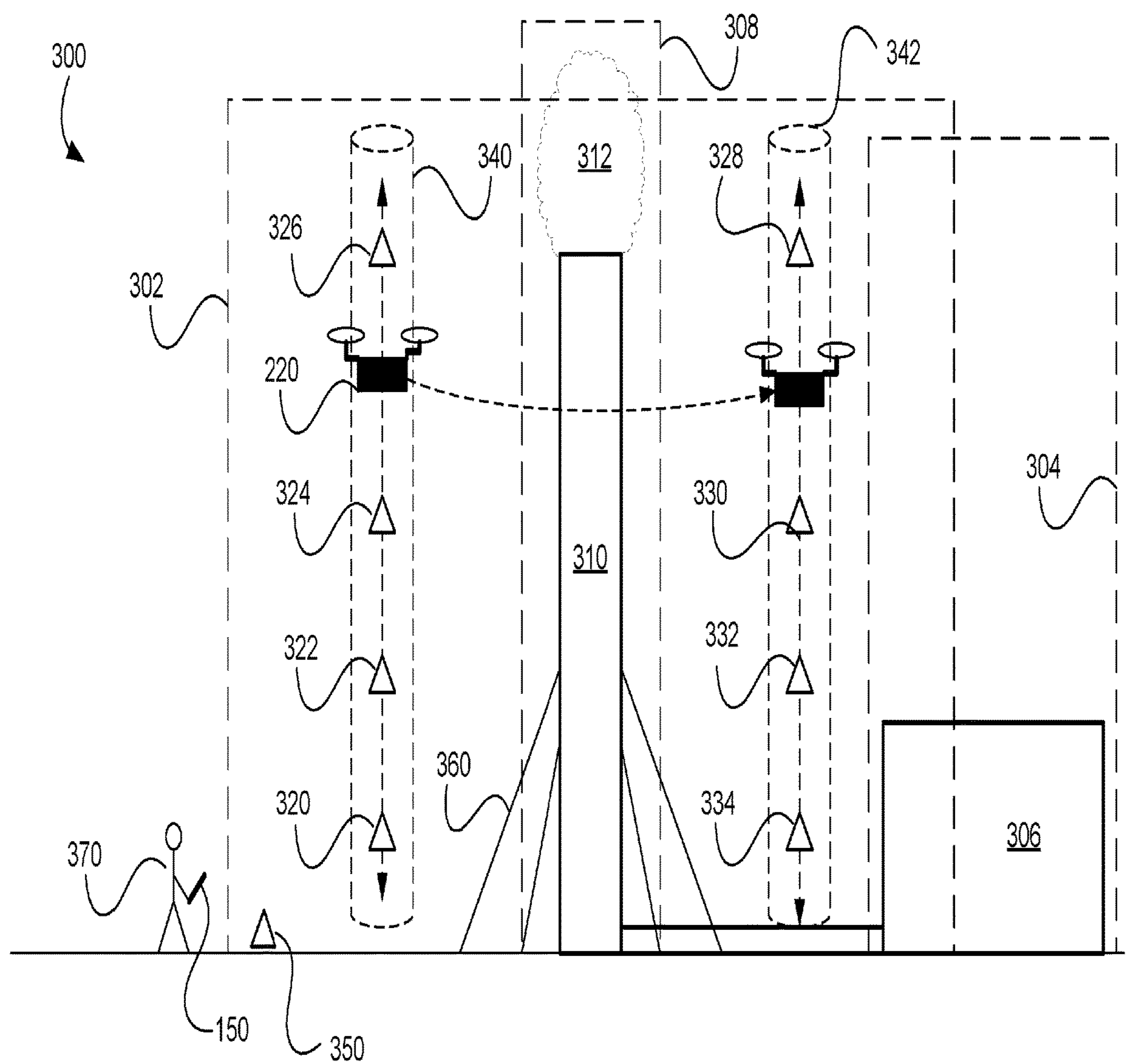
FIG. 3 is an illustration of an example columnar flight plan generated by flight planning system 102 for inspecting a target object.

FIG. 3 is an illustration of an example columnar flight plan 300 generated by flight planning system 102 for inspecting a target object. For example, the flight plan can be an initial flight plan generated by flight planning system 102 for piloting UAV 220 when performing the requested flare stack inspection mission, as described above. The flight plan can include, for example, reserved airspace geofence 302 defining airspace that UAV 220 must stay within while flying the flare stack inspection mission. The flight plan can include a restricted airspace geofence 304 defining airspace around building 306 that UAV 220 must stay outside of while flying the flare stack inspection mission. The flight plan can include restricted airspace geofence 308 defining airspace around flare stack 310 and flare stack emissions 312 that UAV 220 may stay outside of while flying the flare stack inspection mission. For example, geofence 308 can be determined based on the minimum safe distance determined by flight planning system 102, as described above.

In some implementations, the flight plan can include starting/ending location 250 and way points 320-334. For example, waypoints 320-334 can be arranged or ordered such that when UAV 220 moves from way point to way point, UAV 220 follows a flight path that is mostly columnar. For example, way points 320-360 can be arranged in order such than UAV 220 flies vertically upward from way point 320 to way point 326 in column 340. Stated differently, way points 320-326 can be arranged at increasing altitudes over the same ground location so that UAV 220 flies upward over the same ground location from way point 320 to way point 326 while inspecting flare stack 310. After UAV 220 reaches way point 320, UAV 220 can transition to another column (e.g., column 342) where UAV 220 can navigate downward through way points 328-334 while inspecting flare stack 310. For example, way points 320-334 can be arranged so that UAV 220 can collect sensor data for the points of interest on flare stack 310 specified in mission request 202. Further, way points 320-334 can be arranged such that UAV 220 can avoid obstructions, such as guy lines 360 securing flare stack 310. While UAV 220 is flying, UAV operator 370 can monitor the progress of UAV 220 using GCS 150. UAV operator 370 can, for example, control UAV 220 while UAV 220 is in flight using GCS 150. For example, if UAV operator 270 notices a malfunction, dangerous environmental conditions, or some other dangerous situation, UAV operator 270 can initiate a contingency maneuver (e.g., return to base, land in safe zone, etc.) using GCS 150.

Figure 4:
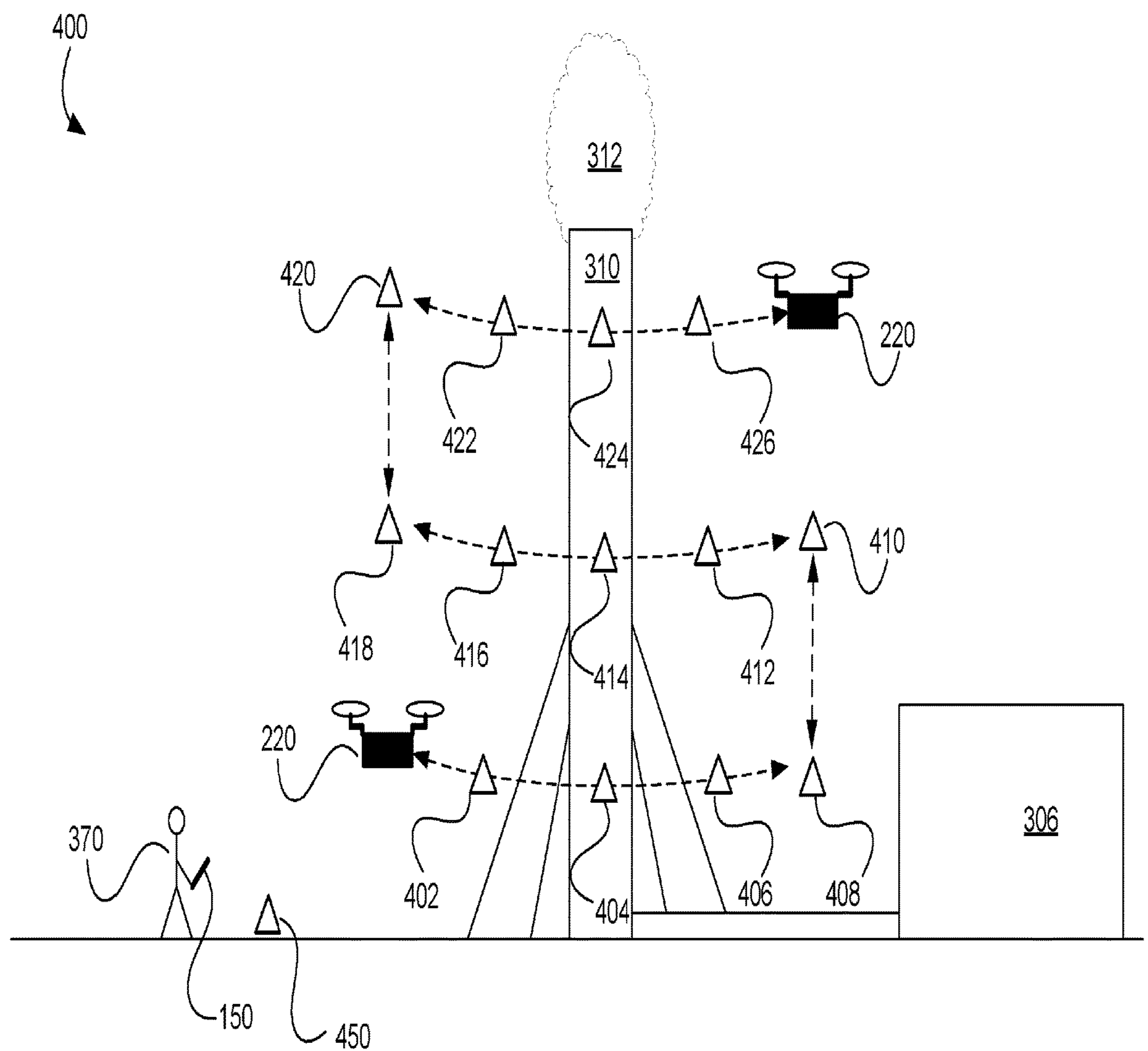
FIG. 4 is an illustration of an example layered flight plan generated by flight planning system 102 for inspecting a target object.

FIG. 4 is an illustration of an example layered flight plan 400 generated by flight planning system 102 for inspecting a target object. For example, the flight plan can have the same geofences as the flight plan of FIG. 3. The lines representing the geofences have been removed in FIG. 4 merely to reduce clutter and make the layered flight plan represented in FIG. 4 more clear.

In some implementations, flight planning system 102 can generate a flight plan that causes UAV to circle flare stack 310 in a horizontal layered flight plan. For example, rather than the vertical columnar approach described in FIG. 3, flight planning system 102 can generate a flight plan such that way points are ordered to cause UAV 220 to inspect flare stack 310 at one altitude (e.g., a first layer or level) before increasing or decreasing altitude to inspect flare stack 310 at a different altitude (e.g., a second layer or level). The altitudes at which UAV 220 circles flare stack 310 can be determined based on the altitudes at which points of interest have been identified on flare stack 310, for example.

In some implementations, the flight plan can specify an order for the way points that causes UAV 220 to take a bottoms up approach to inspecting flare stack 310. For example, UAV 220 can take off from starting location 450 and travel at the same (or about the same) altitude from way point 402 to way point 408 around flare stack 310 while inspecting (e.g., capturing optical and/or thermal images) of flare stack 310. When UAV 220 has circumnavigated flare stack 310 or when UAV 220 reaches an obstruction or restricted airspace geofence, UAV 220 can transition to a higher altitude (e.g., transition to way point 410) and circumnavigate flare stack 310 at the higher altitude (e.g., by navigating from way point 410 to way point 418). After transitioning to the higher altitude, UAV 220 can circumnavigate flare stack 310 in the same direction (e.g., clockwise) as the previous altitude or in a reverse direction (e.g., counter clockwise). For example, UAV 220 may reverse direction when UAV 220 has reached an obstruction or geofence that UAV 220 cannot or should not cross. When UAV 220 reaches way point 418, UAV 220 can again transition to a higher altitude (e.g., to way point 420) and circumnavigate flare stack 310 by travelling from way point 420 to way point 426 while inspecting flare stack 310.

In some implementations, the flight plan can specify a top down approach that causes UAV 220 to travel from way point 426 to way point 402 from a high altitude (way point 426) through decreasing altitudes until reaching the low altitude way point 402. For example, the flight plan can cause UAV 220 to travel in the reverse of the bottoms up approach described above.

Figure 5:
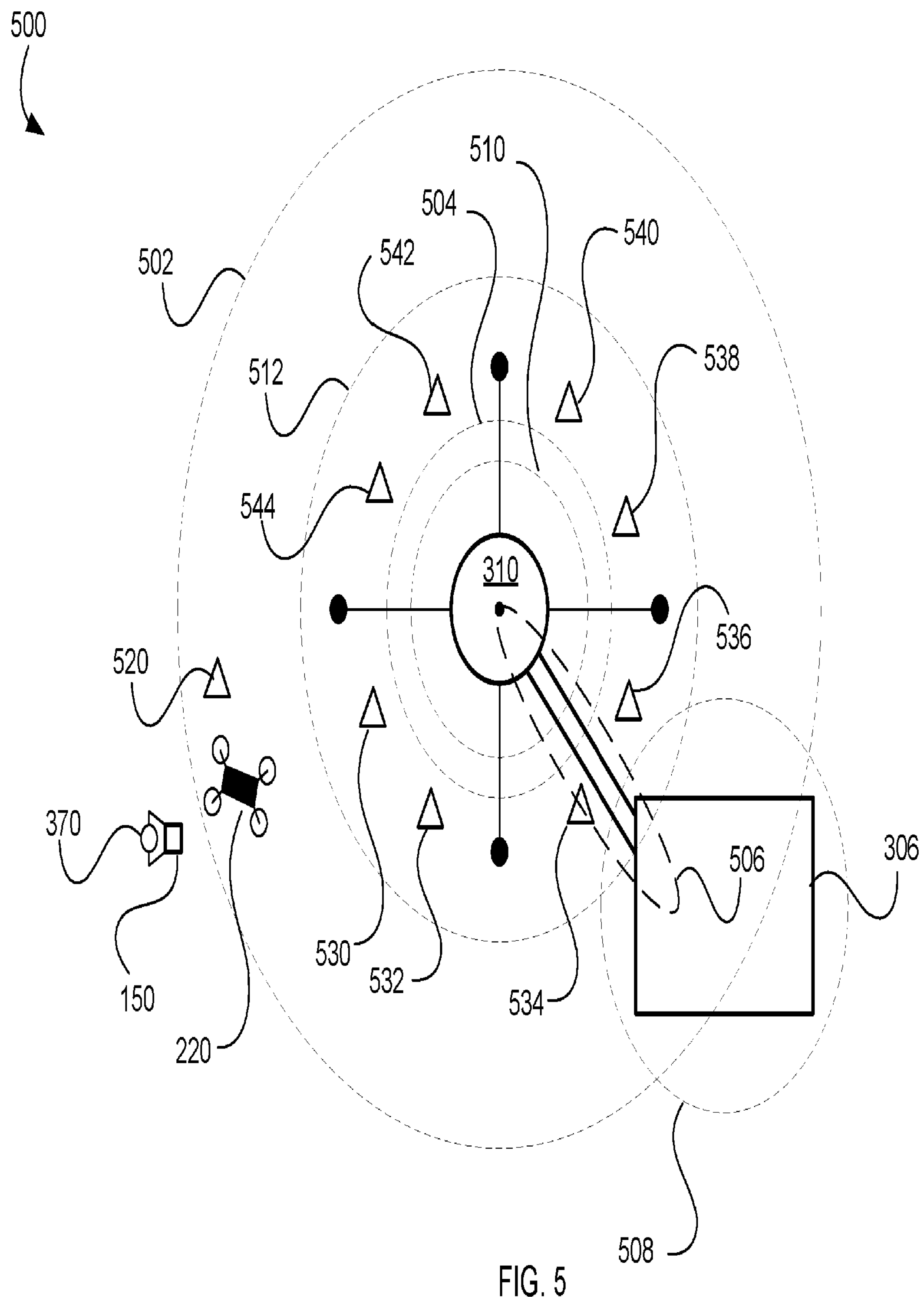
FIG. 5 is an illustration of an initial flight plan generated based on a target definition and/or map data as described above.

FIG. 5 is an illustration of an initial flight plan 500 generated based on a target definition and/or map data as described above. The initial flight plan can be generated by flight planning system 102 based on a static target definition and/or map data and, therefore, may not account for environmental conditions, such as wind, weather, current operating conditions of the flare stack, and or other variables.

In some implementations, flight plan 500 can include reserved airspace geofence 502. For example, geofence 502 can define an airspace that has been reserved for the aerial inspection of flare stack 310. UAV 220 can be programmed to stay within geofence 502 while conducting flight operations. UAV 220 can initiate a contingency maneuver if UAV 220 should stray outside of geofence 502.

In some implementations, flight plan 500 can include restricted airspace geofences 504, 506, and/or 508. For example, geofence 504 can be generated based on the minimum safe operating distance from flare stack 310. For example, the minimum safe operating distance can be determined by flight planning system 102 based on the average heat produced by flare stack 310 and the safe ambient temperature threshold for UAV 220. For example, the safe ambient temperature threshold can correspond to the maximum temperature ambient temperature that UAV 220 can operate in without causing damage to UAV 220. Geofence 506 can be generated by flight planning system 102 to protect a gas pipeline leading to flare stack 310, for example. Geofence 506 can prevent UAV 506 from flying above the gas pipeline to avoid the chance of a collision with or damage to the gas pipeline. Geofence 306 can be generated by flight planning system 102 to protect building 306. UAV 220 can be programmed to stay outside of restricted airspace geofences 504, 506, and/or 508. For example, should UAV 220 stray into one of geofences 504, 506, and/or 508, UAV 220 can perform a contingency maneuver to quickly exit the airspace defined by geofences 504, 506, and/or 508.

In some implementations, flight plan 500 can include minimum stand-off distance 510 and maximum stand-off distance 512. For example, the minimum and maximum stand-off distances can be determined based on the focal lengths (e.g., range of focal lengths) of the cameras configured on UAV 220 and the surface sampling distance defined for the inspection mission. For example, minimum stand-off distance 510 and maximum stand-off distance 512 can define an area in which UAV 220 can move and still capture images that provide the required surface sampling distance. The minimum and maximum stand-off distances allow UAV 220 to adjust its flight path to avoid obstructions and heat damage while still accomplishing the flare stack inspection mission and providing images that meet the required surface sampling distance for the mission. As illustrated by FIG. 5, the minimum standoff distance 510 may be closer to flare stack 310 than geofence 504 may allow. Thus, the effective operating area of UAV 220 for the inspection may be defined by maximum standoff distance 512 and geofence 504 rather than by maximum standoff distance 512 and minimum standoff distance 510.

In some implementations, flight plan 500 can include a flight path defined by take-off/landing location 520 and way points 530-544. For example, since FIG. 5 provides a top-down view of flight plan 500, each way point 530-544 can represent multiple way points having the same ground location but different elevations, as illustrated in FIGS. 3 and 4. Way points 530-544 can be selected by flight planning system 102 based on points of interest determined for the inspection mission, based on restricted airspace geofences, and/or based on the minimum and maximum stand-off distances, as described above. Thus, for example, while flight planning system 102 may initially provide way point 534 as part of the flight plan, flight planning system 102 can remove way point 534 from the flight plan because way point 534 is in the restricted airspace defined by geofence 506. Thus, UAV 220 may be initially configured to perform the flare stack inspection mission by flying to way points 530, 532, and 536-544 and not to way point 534 according to the columnar flight path or layered flight path as described above with reference to FIG. 3 and FIG. 4.

Figure 6:
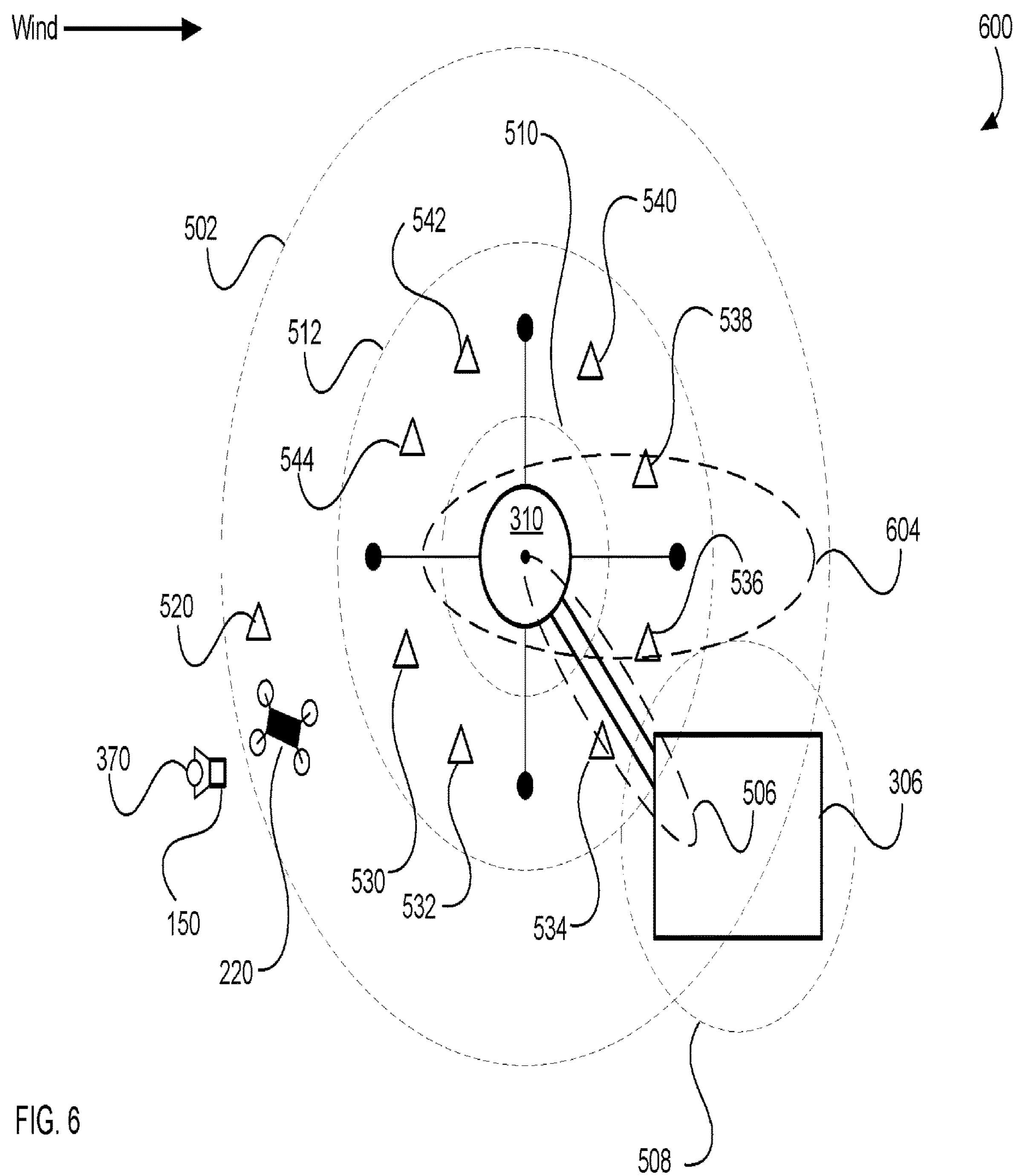
FIG. 6 is an illustration of a modified flight plan generated based on an aerial survey of the area around a target object.

FIG. 6 is an illustration of a modified flight plan 600 generated based on an aerial survey of the area around a target object. For example, while the initial flight plan 500 can be generated by flight planning system 102 based on a static target definition and/or map data, flight plan 600 can be generated by modifying flight plan 500 to account for environmental conditions, such as wind, weather, current operating conditions of the flare stack, and or other variables.

In some implementations, UAV 220 can determine the current environmental conditions around flare stack 310 by performing a high altitude survey of flare stack 310 and surrounding areas. For example, UAV 220 can be configured to fly to a safe altitude above flare stack 310. When UAV 220 reaches the safe altitude, UAV 220 can take a temperature survey of flare stack 310 using a temperature sensor (e.g., thermal imaging sensor 222) to generate a heat map of the area surrounding flare stack 310. UAV 220 can take an optical survey of flare stack 310 using an optical sensor (e.g., optical imaging sensor 224, a camera, etc.) to generate a smoke map of the area surrounding flare stack 310. For example, if flare stack 310 is operating in windy conditions and the wind is blowing from the west to east, the heat and smoke emissions from flare stack 310 will travel from west to east. Thus, the west side of flare stack 310 may be cooler than the east side of flare stack 310 and have better visibility while the heat and smoke generated by flare stack 310 will cover a greater area on the east side of flare stack 310. Based on the heat map and the smoke map, UAV 220 can automatically determine a no-fly zone and corresponding geofence 604 that keeps UAV 220 out of areas where the heat emissions from flare stack 310 exceed the safe ambient temperature threshold of UAV 220 and where the smoke emissions from flare stack 310 will prevent UAV 220 from inspecting flare stack 310. For example, geofence 504 defining a minimum safe operating distance for UAV 220 can be modified or adjusted to become geofence 604 defining a minimum safe operating distance for UAV 220 based on the current environmental conditions around flare stack 310.

In some implementations, UAV 220 can perform additional high altitude surveys based on a detected change in the environmental conditions. For example, a change in the environmental conditions around flare stack 310 can result in damage to UAV 220 if UAV 220 is caught in a shifting high temperature area. In some implementations, UAV 220 can receive weather information (e.g., wind, rain, etc.) from devices external to UAV 220. For example, a wind sensor mounted on flare stack 310 or on building 306 can send wind direction and wind speed information to UAV 220. If UAV 220 determines that the wind direction and/or speed have changed since the initial or previous high altitude survey, UAV 220 can perform another high altitude survey to determine a new heat map around flare stack 310 corresponding to the changed wind direction and/or speed. UAV 220 can use the new heat map to set up geofences (e.g., geofence 504) and avoid a high temperature area that may cause damage to UAV 220, as described above.

In some implementations, UAV 220 can receive information describing the amount of material being burned by flare stack 310. For example, flare stack 310 can have a computerized control system that controls the amount of material being burned by flare stack 310. The control system can send information to UAV 220 describing the amount of material being burned. The heat generated and emitted by flare stack 310 can vary according to the amount of material burned. When UAV 220 receives information indicating that the amount of material being burned by heat stack 310 has changed since the initial or previous high altitude survey, UAV 220 can perform another high altitude survey to determine a new heat map around flare stack 310 corresponding to the increase or decrease in materials burned by flare stack 310. UAV 220 can use the new heat map to set up geofences (e.g., geofence 504) and avoid a high temperature area that may cause damage to UAV 220, as described above.

In some implementations, UAV 220 can send perform a high altitude survey using thermal sensors, optical sensors, etc., and send the sensor data to flight planning system 102 and/or GCS 150. Flight planning system 102 or GCS 150 can then analyze the sensor data, generate the heat map, and generate a modified flight plan with adjusted geofences, way points, etc., as described above.

Figure 7:
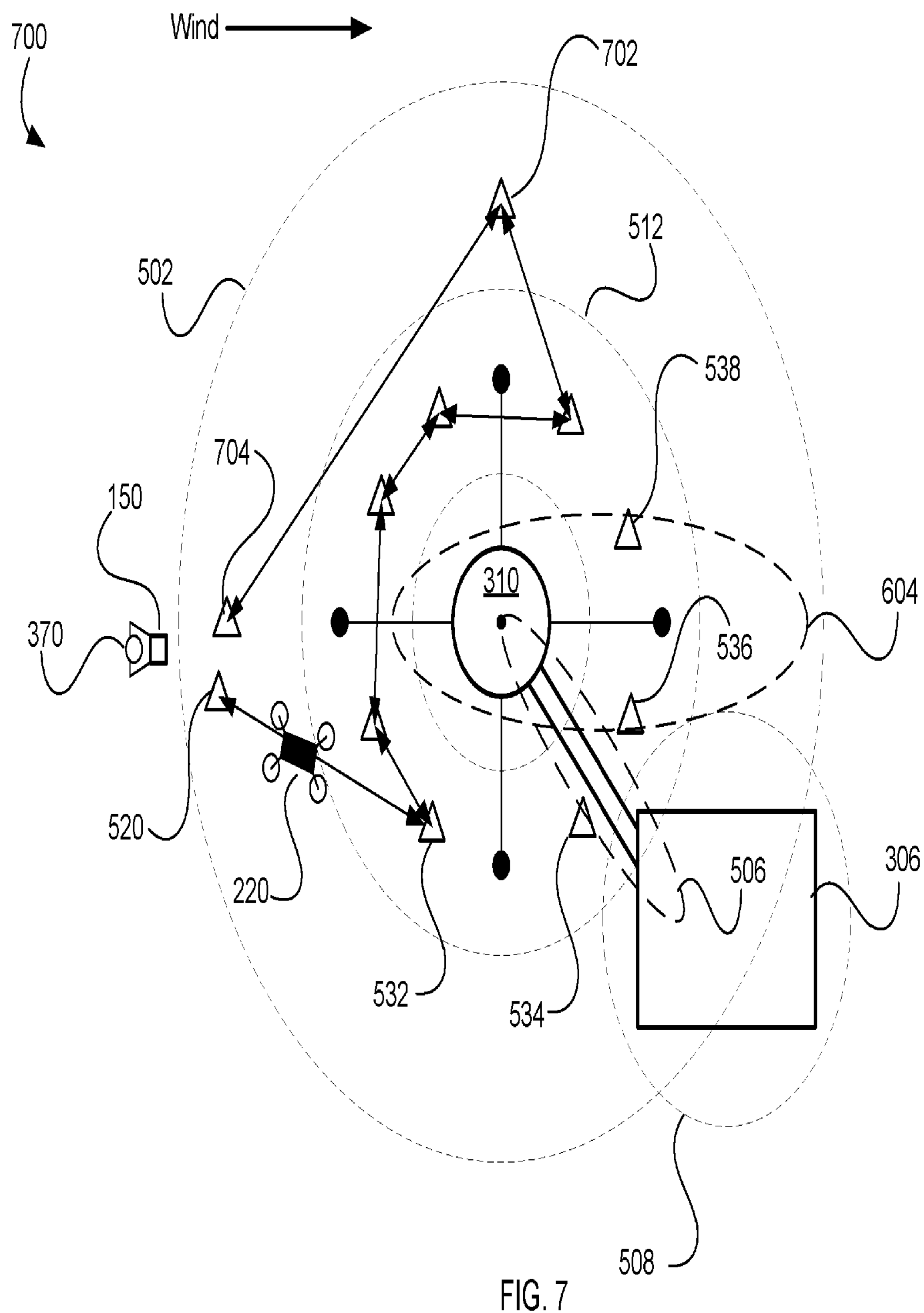
FIG. 7 is an illustration of a modified flight plan generated based on an aerial survey of the area around a target object.

FIG. 7 is an illustration of a modified flight plan 700 generated based on an aerial survey of the area around a target object. For example, flight plan 700 can correspond to flight plan 600 as described above. After the high altitude aerial survey, UAV 220 can determine geofence 604 corresponding to a volumetric area (e.g., airspace) that is too hot for UAV 220 to safely operate within, to smoky for UAV 220 to safely operate within, or both. After generating the restricted airspace geofence 604 based on the aerial survey, heat map, and/or smoke map, as described above, UAV 220 can determine that way points 538 and 536 from the initial flight plan are within geofence 604. In response to determining that way points 538 and 536 are within geofence 604, UAV 220 can exclude way points 538 and 536 from the flare stack inspection mission flight plan to avoid entering geofence 604. Thus, UAV 220 (or GCS 150, flight planning system 102, etc.) can automatically modify the initial flight plan to remove waypoints 534, 536, and 538 that are within restricted airspaces as defined by geofences 506, 508, and 604.

After the high altitude aerial survey and modification of the initial flight plan, UAV 220 can conduct the aerial inspection of flare stack 310 by following a flight path defined by the remaining way points. For example, UAV 220 can fly from take-off location 520 to way point 532 to way point 702, to landing location 704. UAV 220 can fly according to the columnar flight path described with reference to FIG. 3. UAV 220 can fly according to the layered flight path described with reference to FIG. 4.

Figure 8:
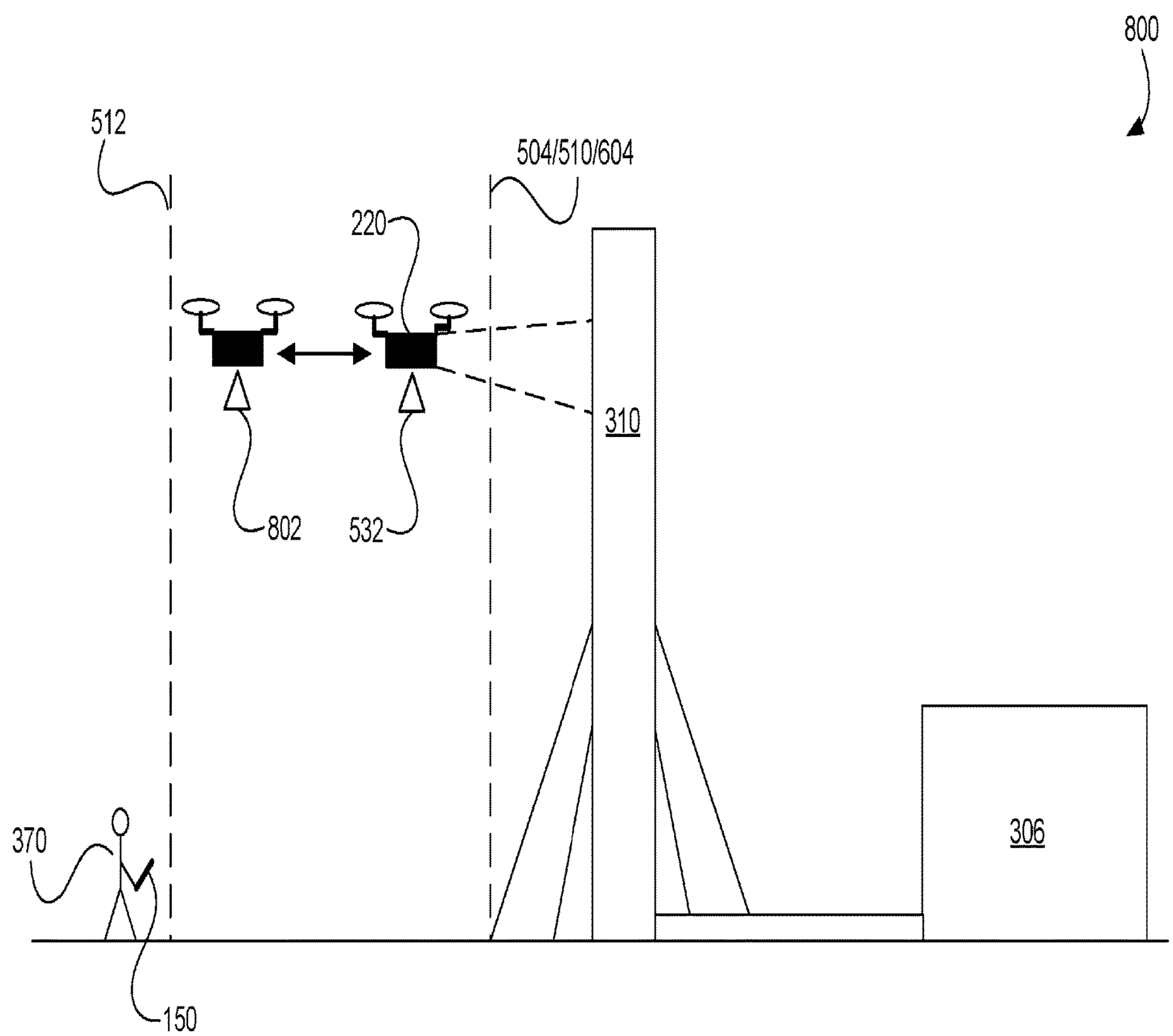
FIG. 8 is an illustration of a UAV automatically adjusting individual way points in real-time based on ambient conditions around the UAV.

FIG. 8 is an illustration 800 of a UAV automatically adjusting individual way points in real-time based on ambient conditions around the UAV. For example, as UAV 220 flies from way point to way point inspecting flare stack 310, UAV 220 can automatically adjust the locations of way points based on ambient conditions around UAV 220. For example, UAV 220 can fly to way point 532, as described above. While at way point 532 or while flying to way point 532, ambient temperature sensor 226 can periodically monitor the ambient temperature around UAV 220. UAV 220 can determine based on the ambient temperature sensor data that the ambient temperature is greater than the safe ambient temperature threshold specified for UAV 220. When a range (e.g., low temperature to high temperature) of safe ambient temperatures is provided, UAV 220 can determine based on the ambient temperature sensor data that the ambient temperature outside the range of safe ambient temperature values. For example, UAV 220 can determine that the detected ambient temperature is below the low temperature threshold specified for UAV 220. UAV 220 can determine that the detected ambient temperature is higher than the high temperature threshold specified for UAV 220.

When ambient temperature sensor 226 determines that the ambient temperature is greater than the safe ambient temperature threshold (or outside the range of safe ambient temperatures) specified for UAV 220, contingency module 166 can determine an alternate way point 802 that is farther away from flare stack 310 to allow UAV 220 to cool off but also allow UAV 220 to still perform the inspection of flare stack 310. For example, UAV 220 can select a location for way point 802 by selecting a location that is farther away from flare stack 310 than way point 532 but closer to flare stack 310 than the maximum standoff distance 512 determined for thermal imaging sensor 222 and optical imaging sensor 224, as described above. After determining the location for alternate way point 802, UAV 220 can move to way point 802 and continue the inspection mission. Thus, while UAV 220 has moved farther away from flare stack 310 to cool off, UAV 220 can still capture images that have the requisite surface sampling distance because UAV 220 has remained within the maximum standoff distance 512 determined for the sensors used for the inspection.

In some implementations, UAV 220 can fly beyond maximum standoff distance 512 when the ambient temperatures generated by flare stack 310 are too high to continue the inspection mission at way point 532/802. UAV 220 can keep track of at which way points the UAV was not able to perform the inspection of flare stack 310 so that the inspection can be attempted again when conditions improve.

In some implementations, UAV 220 can automatically determine when UAV 220 moves too close to flare stack 310. For example, UAV 220 can be configured with distance sensor 228. For example, UAV 220 can use distance sensor 228 to determine when UAV 220 drifts closer to flare stack 310 than the minimum standoff distance 510 or the minimum safe operating distance 504/604. When UAV 220 determines that UAV 220 is within minimum standoff distance 510 or the minimum safe operating distance 504/604, UAV 220 can fly to a position outside of minimum standoff distance 510 or the minimum safe operating distance 504/604. For example, UAV 220 can return to the current way point or move to the next way point in the flight plan.

In some implementations, UAV 220 can determine when UAV is within a smoke cloud generated by flare stack 310. For example, UAV 220 can be configured with an ambient light sensor. When the ambient light sensor detects a low level of ambient light (e.g., below a light threshold value), UAV 220 can determine that UAV 220 is within the smoke cloud fly to the next way point to get out of the smoke cloud. As described above, when UAV 220 leaves a way point without successfully performing an inspection of flare stack 310, UAV 220 can record the failed way point so that the inspection at the way point can be performed at a later time.

Figure 9:
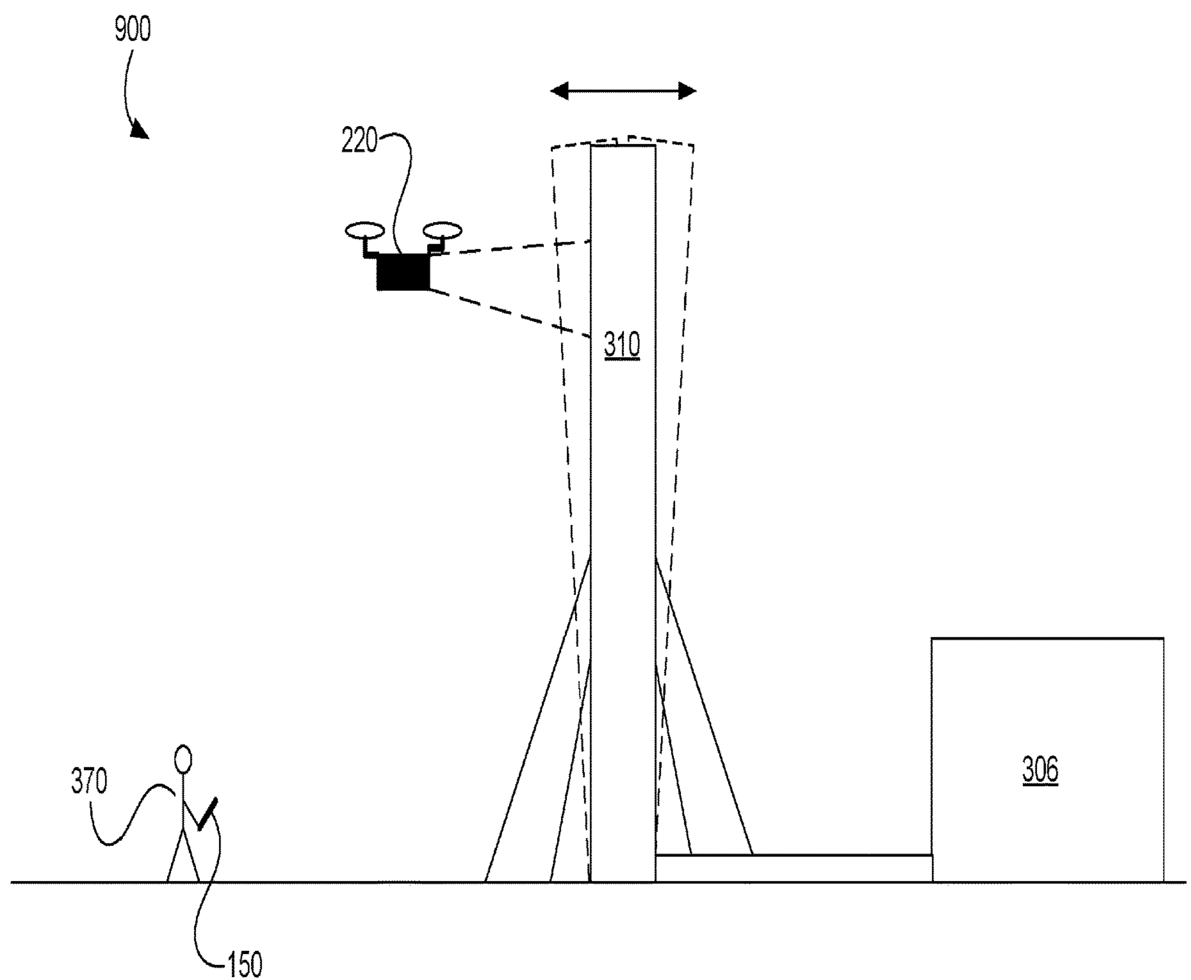
FIG. 9 is an illustration of a UAV inspecting a vibrating target object.

FIG. 9 is an illustration 900 of a UAV inspecting a vibrating target object. For example, when flare stack 310 is operating (e.g., burning materials), the combustion process can cause flare stack 310 to move or vibrate. This movement can cause images captured by the sensors on UAV 220 to be blurry or inaccurate. Thus, in some implementations, UAV 220 can adjust thermal imaging sensor 222 and/or optical imaging sensor 224 (e.g., a camera) to accommodate the movement of flare stack 310.

In some implementations, UAV 220 can determine the vibration characteristics of flare stack 310. For example, UAV 220 can receive predetermined specifications for flare stack 310 that maps material throughput (e.g., the amount of material processed or burned) to vibration frequency and/or magnitude. Alternatively, UAV 220 can automatically determine vibration characteristics of flare stack 310 based on sensor data from distance sensor 228 (e.g., a LIDAR sensor). For example, UAV 220 can direct distance sensor 228 toward flare stack 310, measure the distance between UAV 220 and flare stack 310 as flare stack 310 moves or vibrates, and calculate the vibration frequency and amplitude of flare stack 310 based on the distance measurements.

After determining the vibration characteristics of flare stack 310, UAV 220 can adjust optical imaging sensor 224 to compensate for the vibration of flare stack 310 so that optical imaging sensor 224 can capture a clear image of flare stack 310. For example, UAV 220 can adjust the shutter speed of optical imaging sensor 224 (e.g., a camera) so that optical imaging sensor 224 can capture a clear image of flare stack 310. UAV 220 can adjust the number and/or frequency of images captured by optical imaging sensor 224 so that optical imaging sensor can capture a clear image of flare stack 310.

Example Processes

Figure 10:
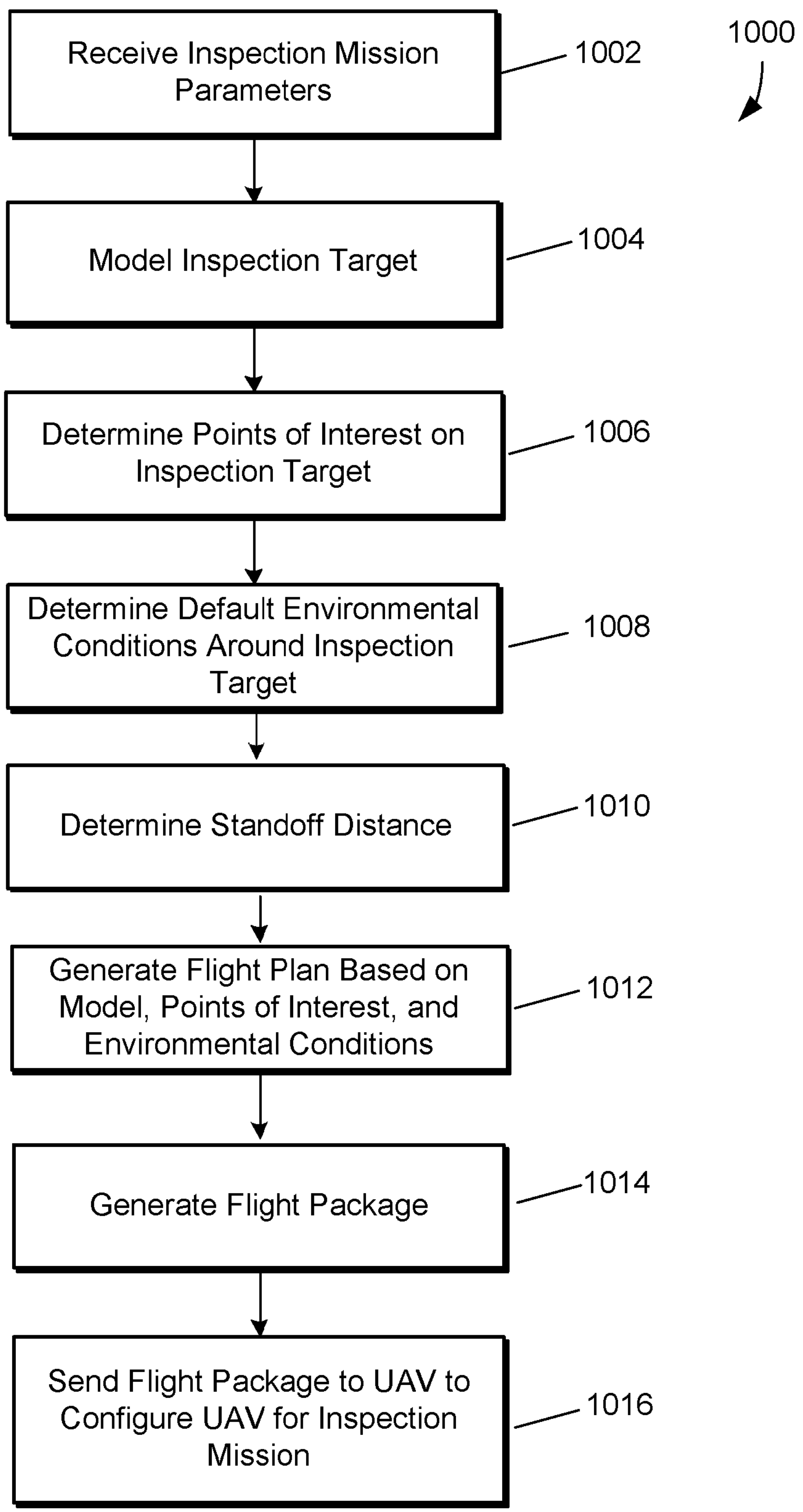
FIG. 10 is a flow diagram of an example process for generating a flight plan for inspecting a flare stack.

FIG. 10 is a flow diagram of an example process 1000 for generating a flight plan for inspecting a flare stack. For example, process 1000 can be performed by flight planning system 102 of FIG. 1 in response to receiving a flare stack inspection mission request from a UAV operator.

At step 1002, flight planning system 102 can receive flare stack inspection mission parameters. For example, flight planning system 102 can receive the mission parameters in mission request 202 of FIG. 2.

At step 1004, flight planning system 102 can model the inspection target object. For example, flight planning system 102 can model the flare stack based on a target definition received in mission request 202.

At step 1006, flight planning system 102 can determine points of interest on the inspection target. For example, flight planning system 102 can determine points of interest for inspecting on the flare stack based on inspection points or inspection areas defined in mission request 202, as described above.

At step 1008, flight planning system 102 can determine predicted environmental conditions around the inspection target object. For example, flight planning system 102 can obtain information describing the standard heat emissions and/or smoke emissions of the flare stack to be inspected. For example, flight planning system 102 can obtain a heat map that shows volumetric areas or airspace around the flare stack and the typical temperatures of the airspace around the flare stack when the flare stack is operating under normal or typical operating conditions (e.g., clear skies, no wind, standard material throughput, etc.).

At step 1010, flight planning system 102 can determine a standoff distance for performing the inspection of the target object. For example, flight planning system 102 can determine the standoff distance (or range of standoff distances) based on a surface sampling distance specified in the mission parameters received at step 1002 and the specifications for the imaging sensors, cameras, etc., that will be used to inspect the target object (e.g., the flare stack).

At step 1012, flight planning system 102 can generate a flight plan based on the target object model, the points of interest, the standoff distance, and the environmental conditions. For example, flight planning system 102 can determine no-fly zones (e.g., geofences) based on the environmental conditions. Flight planning system 102 can select way points for the flight plan based on the object model and standoff distance that allows the UAV to inspect the points of interest without flying into the no-fly zones around the target object. Flight planning system 102 can define contingency events and corresponding contingency maneuvers for the flight plan based on the no-fly zones, UAV operating thresholds (e.g., heat thresholds), and/or other conditions, as described above.

At step 1014, flight planning system 102 can generate a flight package that includes the flight plan. For example, flight planning system 102 can generate a flight package that provides configuration data and/or programming for the UAV to fly (e.g., autopilot) the flare stack inspection mission.

At step 1016, flight planning system 102 can send the flight package to the UAV. For example, flight planning system 102 can send the flight package to UAV 220 to configure UAV 220 to fly the flare stack inspection mission defined in the flight package.

Figure 11:
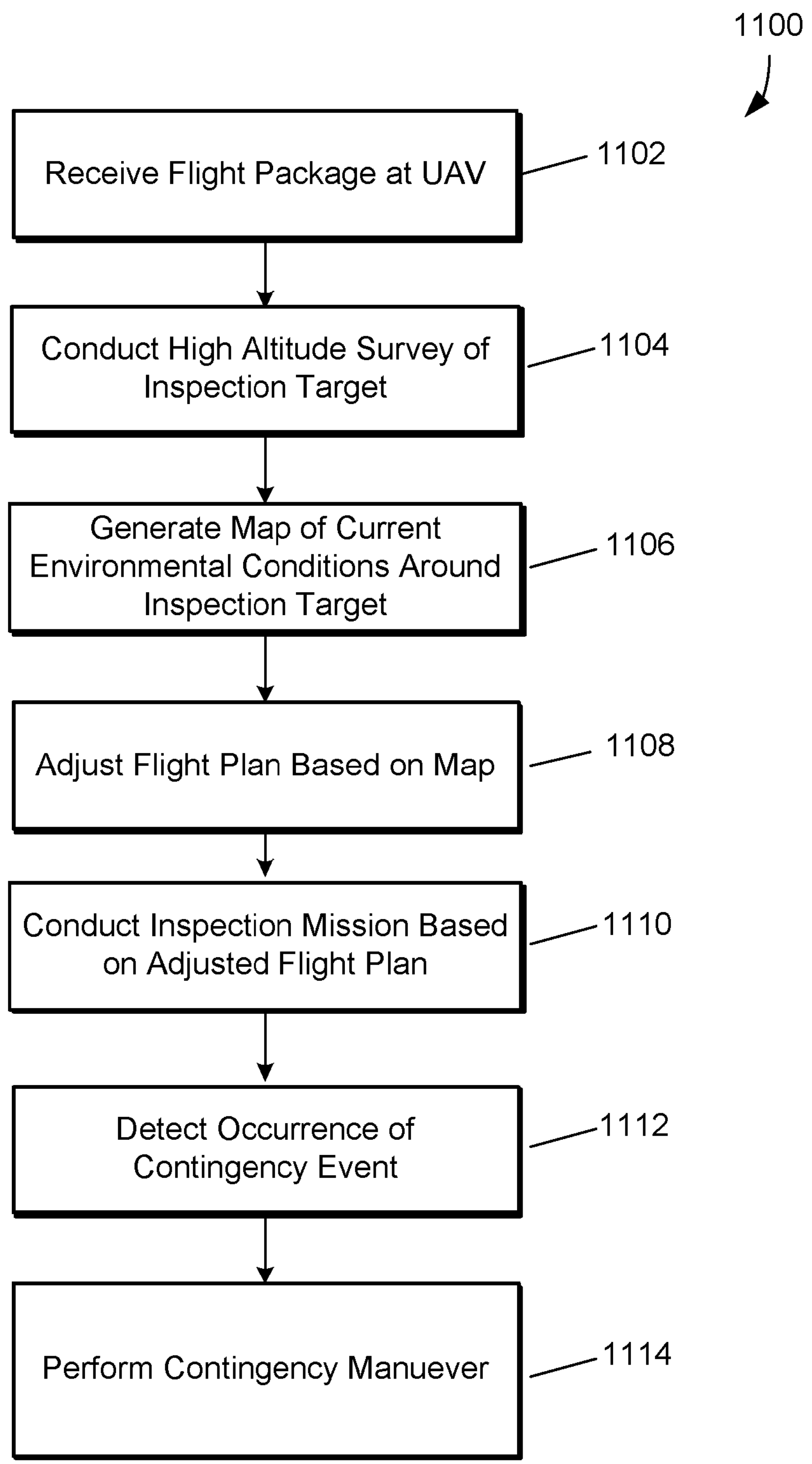
FIG. 11 is a flow diagram of an example process for executing a flight plan for inspecting a flare stack.

FIG. 11 is a flow diagram of an example process 1100 for executing a flight plan for inspecting a flare stack. For example, process 1100 can be performed by UAV 220 based on a flight package generated by flight planning system 102, as described above.

At step 1102, UAV 220 can receive a flight package. For example, UAV 220 can receive the flight package generated by flight planning system 102 for inspecting a flare stack, as described above. The flight package can include a model of the flare stack to be inspected, locations of inspection points on the flare stack, a flight plan including way points for inspecting the flare stack, standoff distances calculated for capturing images having a specified surface sampling distance, geofences defining reserved airspace and/or no-fly zones, contingency events and corresponding contingency maneuvers, and/or other information necessary for performing an aerial inspection of the targeted flare stack.

At step 1104, UAV 220 can conduct a high altitude survey of the inspection target object. For example, before executing the flight plan, UAV 220 can fly to a safe altitude above the flare stack and perform a heat and/or smoke survey of the area around the flare stack using optical and thermal imaging sensors configured on UAV 220.

At step 1106, UAV 220 can generate a map of the current environmental conditions around the inspection target. For example, based on the survey, UAV 220 can generate a heat map and/or a smoke map that describes the amount of heat and/or smoke at various locations around the flare stack.

At step 1108, UAV 220 can adjust the flight plan based on the generated map. For example, UAV 220 can adjust the flight plan based on the current conditions around the flare stack. UAV 220 can adjust the flight plan by generating no-fly zones/geofences around areas of high heat and/or smoke that may damage UAV 220 and/or interfere with the inspection of the flare stack. UAV 220 can remove way points that correspond to locations within the no fly zones from the flight plan. UAV 220 may change the order or sequence of the way points in the flight plan and/or make other modifications to the flight plan, as described herein above.

At step 1110, UAV 220 can conduct the inspection mission based on the adjusted flight plan. For example, UAV 220 can fly to the way points specified in the adjusted flight plan and capture optical and/or thermal images of points of interest on the flare stack.

In some implementations, UAV 220 can update the heat map generated at step 1106 while conducting the inspection mission. For example, while UAV 220 is navigating (e.g., flying) from waypoint to waypoint, UAV 220 can (e.g., periodically) capture ambient temperature sensor readings and current location information for UAV 220. UAV 220 can then update the heat map with the actual ambient temperature sensor readings and current location information.

At step 1112, UAV 220 can detect the occurrence of a contingency event. For example, UAV 220 can detect a contingency event when the ambient temperature around UAV 220 exceeds a safe operating temperature. UAV can detect a contingency event when the ambient light around UAV 220 falls below a threshold light level. UAV can detect a contingency event when UAV 220 enters a restricted airspace (e.g., no-fly zone) geofence. UAV 220 can detect a contingency event when UAV 220 moves closer than a threshold distance from the flare stack. UAV 220 can detect other contingency events, as may described herein.

At step 1114, UAV 220 can perform a contingency maneuver. For example, UAV 220 can perform a contingency maneuver in response to detecting a contingency event. For example, UAV 220 can perform a contingency maneuver that causes UAV 220 to fly to the previous way point in the flight plan. UAV 220 can perform a contingency maneuver that causes UAV 220 to fly to an emergency landing location and land. UAV 220 can perform a contingency maneuver that causes UAV 220 to fly a distance away from the flare stack to cool off UAV 220. UAV 220 can perform a contingency maneuver that causes UAV 220 to exit a restricted airspace geofence. UAV 220 can perform a contingency maneuver that causes UAV 220 to skip the flare stack inspection at the current way point, fly to the next way point in the flight plan (e.g., that has an ambient temperature below the safe operating temperature threshold for UAV 220), and continue the flight plan.

Many of the implementations described include UAV 220 performing data collection using various sensors and data analysis to determine safe or unsafe airspace, generate geofences, generate heat or smoke maps, etc. However, according to some implementations, UAV 220 can send sensor data (e.g., imaging sensor data, thermal sensor data, etc.) to flight planning system 102 and/or GCS 150 for analysis. Thus, in some implementations, flight planning system 102 and/or GCS 150 may perform the sensor data analysis to determine safe or unsafe airspace, generate geofences, and/or generate heat and/or smoke maps. After performing the analysis of the sensor data and determining safe or unsafe airspace, generating geofences, and/or generating heat/smoke maps, flight planning system 102 and/or GCS 150 can send an updated or modified flight plan to UAV 220 that includes the updated flight plan, geofences, heat maps, etc., so that UAV 220 can continue flying the flare stack inspection mission in a safe manner.

In some implementations, after UAV 220 finishes the flare stack inspection mission, UAV 220 can send the optical and/or thermal images of the flare stack to flight planning system 102 and/or GCS 150. After receiving the images, flight planning system 102 and/or GSC 150 can send the images to user device 140 so that the UAV operator and/or flare stack operator can determine the condition of the flare stack. For example, the UAV operator and/or flare stack operator can determine whether the flare stack has any damage, wear or corrosion that requires repair based on the optical and/or thermal images.

Example System Architecture

Figure 12:
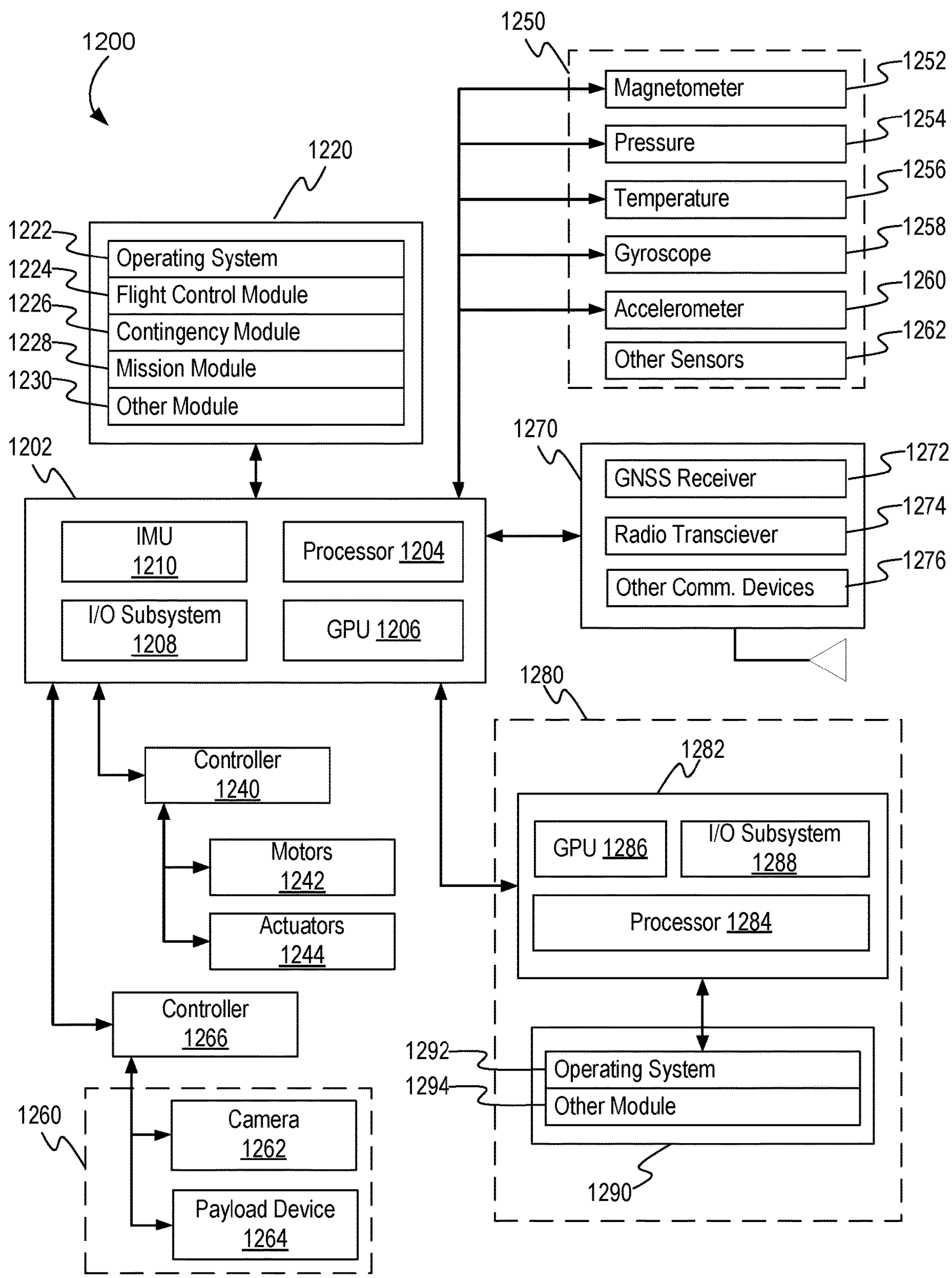
FIG. 12 illustrates a block diagram of an example unmanned aerial vehicle (UAV) architecture for implementing the features and processes described herein.

FIG. 12 illustrates a block diagram of an example system architecture 1200 for an unmanned aerial vehicle (UAV).

For example, system architecture 1200 can be configured with the hardware and/or software for implementing the UAV features and processes described herein. System architecture 1200 can correspond to UAV 160, as described above with reference to FIG. 1.

In some implementations, system architecture 1200 can include primary processing system 1202. For example, primary processing system 1202 can be a system of one or more computers, including hardware and/or software that is in communication with, or maintains, one or more databases. In some implementations, primary processing system 1202 can include one or more processors 1204 (e.g., CPU, application processor, etc.), graphics processors 1206 (e.g., GPU), and/or I/O subsystem 1208. In some implementations, primary processing system 1202 can include additional or different logic circuits, analog circuits, associated volatile and/or non-volatile memory, associated input/output data ports, power ports, etc., not shown. Similarly, primary processing system can include various software processes executing on processors 1204 or other computers included in primary processing system 1202.

In some implementations, memory 1220 may include non-volatile memory, such as one or more magnetic disk storage devices, solid state hard drives, or flash memory. Other volatile memory such a RAM, DRAM, SRAM may be used for temporary storage of data while the UAV is operational. Memory 1220 may include databases for storing information describing UAV flight operations, flight plans, contingency events, geofence information, component information, and other information. Memory 1220 may include various modules, programs, applications, and/or instructions that cause the UAV to perform flight operations, contingency maneuvers, missions, and other functions.

In some implementations, memory 1220 can include operating system 1222. For example, operating system 1222 can be a real time operating system (RTOS), UNIX, LINUX, OS X, WINDOWS, ANDROID or other operating system. Operating system 1222 may include instructions for handling basic system services and for performing hardware dependent tasks. However, other software modules and/or applications may be executed as operating system processes. For example, flight control module 1224, contingency module 1226, and/or mission module 1228, may be part of operating system 1220 and may be executed as operating system processes.

In some implementations, memory 1220 can include flight control module 1224. For example, flight control module 1224 (e.g., flight control module 164) can be configured to handle flight control operations for the UAV. Flight control module 1224 can interact with one or more controllers 1240 that control operation of motors 1242 and/or actuators 1244. For example, motors 1242 may be used for rotation of UAV propellers. Actuators 1244 may be used for UAV flight surface control such as ailerons, rudders, flaps, landing gear, and parachute deployment.

In some implementations, memory 1220 can include contingency module 1226. For example, contingency module 1226 (e.g., contingency module 166) can monitor and handle UAV contingency events. For example, contingency module 1226 may detect that the UAV has crossed a border of a geofence, and then instruct flight control module 1224 to return to a predetermined landing location. Contingency module 1226 can detect other contingency events, including a low battery or fuel state, a malfunction of an onboard sensor, motor, or other component, and/or a deviation from the flight plan. When contingency module 1226 detects a contingency event, contingency module 1226 can instruct flight control module 1224 to return to a predetermined landing location or perform some other contingency operation. For example, if the UAV is equipped with a parachute, contingency module 1226 may cause the deployment of the parachute when a motors and/or actuator fails. The foregoing is not meant to be limiting, as contingency module 1226 may detect other contingency events and/or perform other contingency operations.

In some implementations, memory 1220 can include mission module 1228. For example, mission module 1228 (e.g., mission module 162) can process flight plans, waypoints, and other associated information with a flight plan as provided to the UAV in a flight package. For example, a flight package can include one or more flight plans. Each flight plan can including a flight schedule (e.g., start time, end time), start location, destination location, way points for navigating from the start location to the destination location, contingency event definitions, contingency operations for each contingency event. The flight package can include operator (e.g., pilot) information, such as the name of the operator, the operator's employer, the operator's license information (e.g., including UAV ratings), etc. The flight package can include UAV information, such as the UAV type, payload, model, size, operating range, an/or other UAV specifications describing the UAV that will perform the mission described by the flight package. In some implementations, mission module 1228 can work in conjunction with flight control module 1224. For example, mission module 1228 can send information concerning the flight plan to flight control module 1224. For example, mission module 1228 can send flight control module 1224 the flight start location, end location, waypoint coordinates (e.g., latitude, longitude), flight altitude, flight velocity, etc., so that the flight control module 1224 can automatically pilot the UAV along the flight path.

Various sensors, devices, firmware and other systems may be interconnected to support multiple functions and operations of the UAV. For example, the UAV primary processing system 1202 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

In some implementations, primary processing system 1202 may be coupled to one or more sensors 1250, such as magnetometer 1252, pressure sensors (static or differential) 1254, temperature sensors 1256, gyroscopes 1258, accelerometers 1260, and/or other sensors 1262, such as current sensors, voltage sensors, hydrometer, motor sensors and/or any other sensors, as may be described herein.

In some implementations, primary processing system 1202 may use an inertial measurement unit (IMU) 1210 for use in navigating the UAV. For example, IMU 1210 can use measurements from magnetometer 1252, gyroscope 1258, accelerometer 1260 and/or other sensors to determine the specific force of the UAV, the angular rate of the UAV, and/or magnetic field surrounding the UAV. Sensors 1250 and/or other components of architecture 1200 can be coupled to primary processing system 1202, or to controller boards coupled to primary processing system 1202, using one or more communication buses, such as a controller area network (e.g., CAN) bus, or other signal lines.

In some implementations, primary processing system 1202 may have various devices 1260 connected to it for data collection. For example, devices 1260 can include one or more cameras 1262. For example, cameras 1262 can include digital (e.g., CMOS image sensor) or analog (e.g. film) photographic imaging devices. Cameras 1262 can include, for example, a video cameras, an infra-red camera, and/or a multispectral camera. Devices 1260 can include payload device 1264. For example, payload device 1264 can be a mission-specific device used by primary processing system 1202 to collect mission-specific data and information for performing mission-specific tasks, such as collecting data needed to perform the processes and functions described above with reference to FIGS. 1-11.

In some implementations, devices 1260 can include additional sensors or electronic systems, such as Lidar, radio transceivers, sonar, and/or a traffic collision avoidance system (TCAS), video camera, infra-red camera, multispectral camera, stereo camera pair, Lidar, radio transceiver, sonar, laser ranger, altimeter, ADS-B (Automatic dependent surveillance-broadcast) transponder, etc.

In some implementations, primary processing system 1202 can interact with devices 1260 through controllers 1266. For example, controllers 1266 may be used to interact with and/or operate camera 1262 and/or payload device 1264. Data collected by devices 1260 may be stored on the device collecting the data (e.g., in camera 1262, in payload device 1264, etc.), or the data may be stored on non-volatile memory 1220 of primary processing system 1202.

In some implementations, primary processing system 1202 may be coupled to communication subsystem 1270. For example, communication subsystem 1270 can include a global navigational satellite system (GNSS, GPS, etc.) receiver 1272 for receiving satellite signals used by primary processing system 1202 to determine the current location of the UAV.

In some implementations, communication subsystem 1270 can include radio transceiver 1274. For example, a UAV ground station (e.g., stationary or mobile) can send command and control signals to the UAV using radio transmissions to manually control the UAV. The UAV can receive the command and control signals using radio transceiver 1274. In some implementations, radio transceiver 1274 can be used for wireless or wired data transmission to and from the UAV primary processing system 1202, and optionally the UAV secondary processing system 1202.

In some implementations, the UAV may use one or more communications subsystems 1270, such as a wireless communication or wired subsystem, to facilitate communication to and from the UAV. Wireless communication subsystems 1270 may include radio transceivers, and infrared, optical ultrasonic, electromagnetic devices. Wired communication systems 1270 may include ports such as Ethernet, USB ports, serial ports, or other types of port to establish a wired connection to the UAV with other devices, such as a ground control system, flight planning system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

In some implementations, flight data logs may be generated by obtaining various information from the UAV sensors 1250, devices 1260, communication subsystems 1270, operating system 1222 and/or other components of UAV system architecture 1200 and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

In addition to the UAV primary processing system 1202, a secondary processing system 1282 may be used to run a secondary computing environment 1280 within the UAV for performing other processes or functions, such as the process and functions for dynamically adjusting UAV flight operations based on thermal sensor data, as described above with reference to FIGS. 1-11. For example, typically flight critical functions of the UAV will be performed using primary processing system 1202, while mission specific, secondary, or auxiliary functions of the UAV may be performed using secondary processing system 1282. Further, even though secondary processing system 1282 operates in secondary computing environment 1280, secondary processing system 1282 may be able to access memory 1220, sensors 1250, devices 1260, and/or communication subsystem 1270 (e.g., through primary processing system 1202) in order to perform various processes and/or functions, such as the process and functions for dynamically adjusting UAV flight operations based on thermal sensor data, as described above with reference to FIGS. 1-11.

In some implementations, UAV secondary processing system 1282 can be a system of one or more computers, or software executing on a system of one or more computers, which is in communication with, or maintains, one or more databases. The UAV secondary processing system 1282 can include one or more processors 1284, graphics processors 1286, and/or I/O subsystem 1288. In some implementations, secondary processing system 1282 can include other or additional components, such as logic circuits, analog circuits, associated volatile and/or non-volatile memory, associated input/output data ports, power ports, etc. Secondary processing system 1282 can include one or more software processes, modules, instructions executing on processors 1284, GPU 1286, and/or other components of secondary processing system 1282.

In some implementations, secondary processing system 1282 can be coupled to memory 1290 in secondary computing environment 1280. For example, memory 1290 may include non-volatile memory, such as one or more magnetic disk storage devices, solid state hard drives, flash memory. Memory 1290 may include volatile memory such a RAM, DRAM, SRAM that may be used for storage of data, applications, instructions, etc., while the UAV is operational. Ideally modules, applications and other functions running on the secondary processing system 1282 will be non-critical functions in nature, that is, if the function fails, the UAV will still be able to safely operate.

In some implementations, memory 1290 can include operating system 1292. For example, operating system 1292 can be a real time operating system (RTOS), UNIX, LINUX, OS X, WINDOWS, ANDROID or other operating system. Operating system 1292 may include instructions for handling basic system services and for performing hardware dependent tasks. However, in some implementations, operating system 1292 may include instructions for handling the processes and functions as described above with reference to FIGS. 1-11.

In some implementations, memory 1290 can include other software modules 1294. For example, other software modules 1294 and/or applications may be run by secondary processing system 1282 in secondary computing environment 1280, such as software modules and/or application for performing the processes and functions described above with reference to FIGS. 1-11.

Figure 13A:
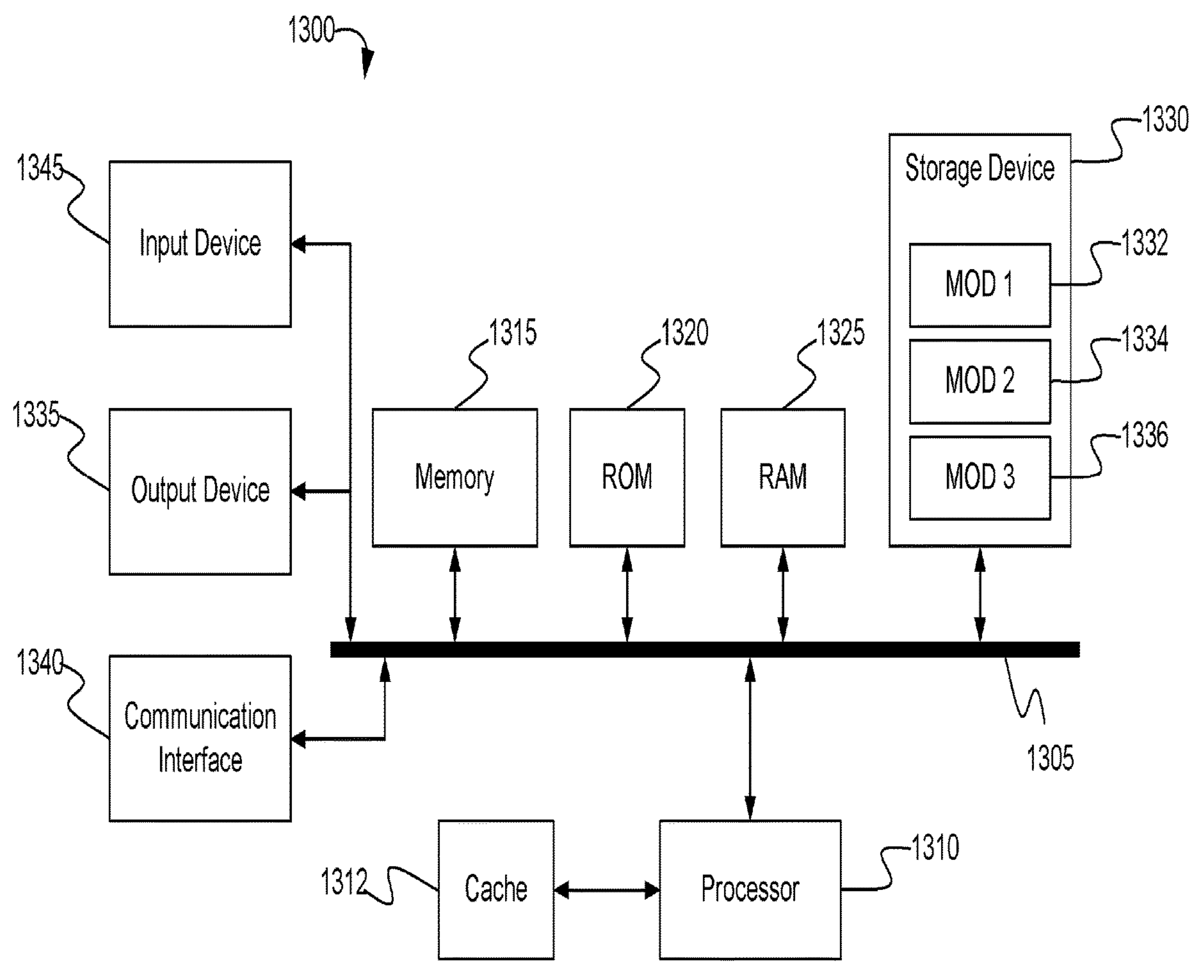
FIG. 13A and FIG. 13B show example system architectures for the computing devices performing the various operations, processes, and functions described herein.
Figure 13B:
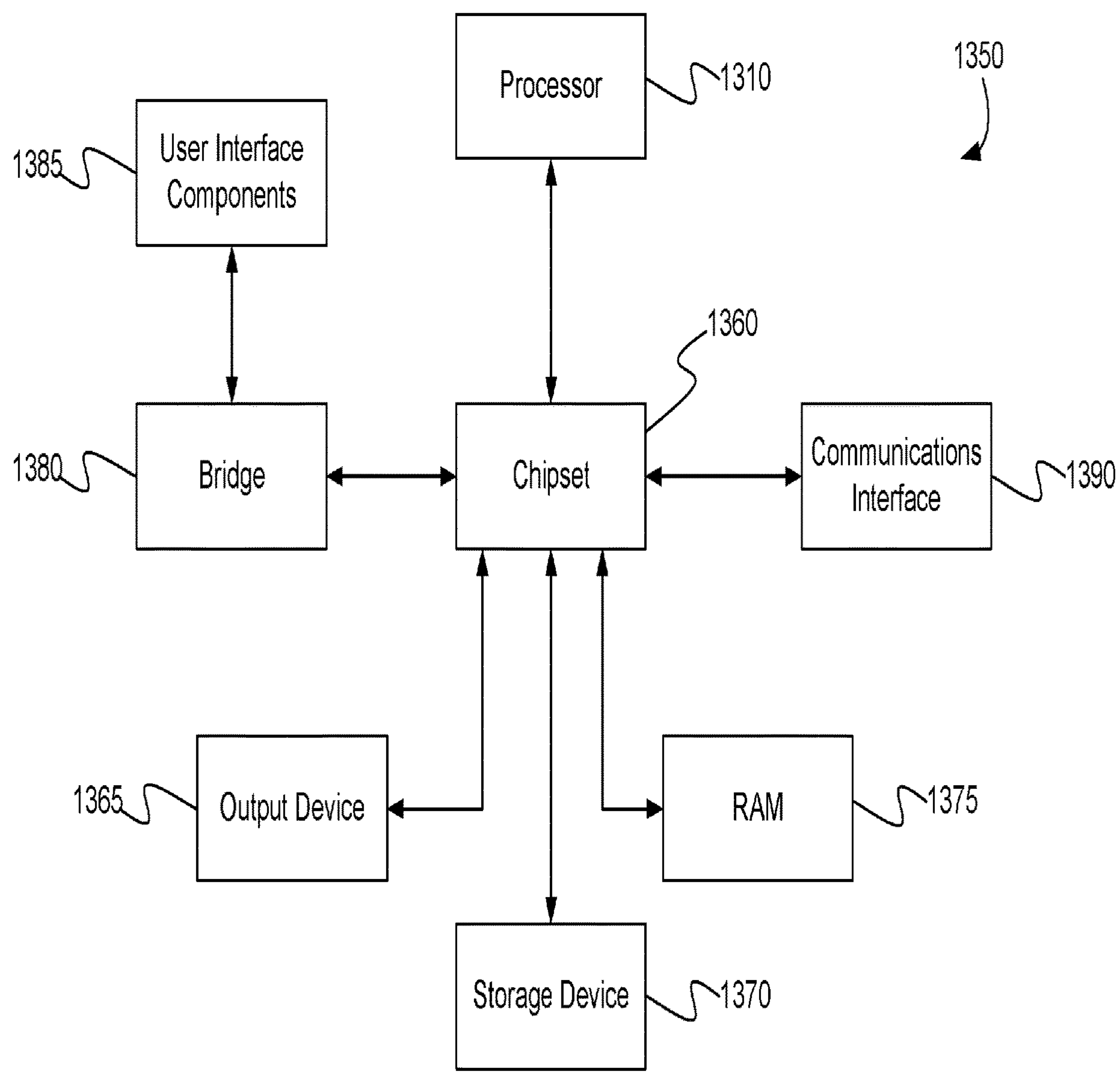

FIG. 13A and FIG. 13B show example system architectures 1300 and 1350 for the computing devices performing the various operations, processes, and functions described herein. The more appropriate embodiment will be apparent to those of ordinary skill in the art when practicing the present technology. For example, system architectures 1300 and/or 1350 can correspond to flight planning system 102, user device 140, and/or ground control system 150, described above with reference to FIG. 1. System architectures 1300 and/or 1350 may be incorporated into system architecture 1200 to enable the various operations, processes, functions and features of UAV 160. Persons of ordinary skill in the art will also readily appreciate that other system embodiments are possible.

FIG. 13A illustrates a conventional system bus computing system architecture 1300 wherein the components of the system are in electrical communication with each other using a bus 1305. Example system 1300 includes a processing unit (CPU or processor) 1310 and a system bus 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well. The memory 1315 can include multiple different types of memory with different performance characteristics. The processor 1310 can include any general purpose processor and a hardware module or software module, such as module 1 1332, module 2 1334, and module 3 1336 stored in storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include software modules 1332, 1334, 1336 for controlling the processor 1310. Other hardware or software modules are contemplated. The storage device 1330 can be connected to the system bus 1305. In one aspect, a hardware module that performs a particular function can include the software component stored in a computer-readable medium in connection with the necessary hardware components, such as the processor 1310, bus 1305, display 1335, and so forth, to carry out the function.

FIG. 13B illustrates a computer system 1350 having a chipset architecture that can be used in executing the described method and generating and displaying a graphical user interface (GUI). Computer system 1350 is an example of computer hardware, software, and firmware that can be used to implement the disclosed technology. System 1350 can include a processor 1310, representative of any number of physically and/or logically distinct resources capable of executing software, firmware, and hardware configured to perform identified computations. Processor 1310 can communicate with a chipset 1360 that can control input to and output from processor 1310. In this example, chipset 1360 outputs information to output 1365, such as a display, and can read and write information to storage device 1370, which can include magnetic media, and solid state media, for example. Chipset 1360 can also read data from and write data to RAM 1375. A bridge 1380 for interfacing with a variety of user interface components 1385 can be provided for interfacing with chipset 1360. Such user interface components 1385 can include a keyboard, a microphone, touch detection and processing circuitry, a pointing device, such as a mouse, and so on. In general, inputs to system 1350 can come from any of a variety of sources, machine generated and/or human generated.

Chipset 1360 can also interface with one or more communication interfaces 1390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1310 analyzing data stored in storage 1370 or 1375. Further, the machine can receive inputs from a user via user interface components 1385 and execute appropriate functions, such as browsing functions by interpreting these inputs using processor 1310.

It can be appreciated that example systems 1300 and 1350 can have more than one processor 1310 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Each of the processes, methods, and algorithms described in the preceding sections may be embodied in, and fully or partially automated by, code modules executed by one or more computer systems or computer processors comprising computer hardware. The code modules may be stored on any type of, one or more, non-transitory computer-readable media (e.g., a computer storage product) or computer storage devices, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the term "module", as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as a compact discs, digital video discs, flash drives, or any other tangible media. Such software code may be stored, partially or fully, on a memory device of the executing computing device, such as airspace reservation module 302, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart-phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a toolbar, a pop up menu, interactive voice response system, or otherwise.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A system, comprising:

one or more processors; and a memory storing instructions that, when executed by the one or more processors, cause the one or more processors to:

navigate an unmanned aerial vehicle (UAV) according to a flight plan for inspecting a structure which generates heat;

while the UAV navigates according to the flight plan:

periodically monitor ambient temperature external to the UAV;

store a plurality of ambient temperature values and respective geospatial locations of where the ambient temperature was monitored;

process the plurality of ambient temperature values and the respective geospatial locations to determine an area of high heat exceeding a safe ambient temperature threshold defined for the UAV along the structure; and dynamically adjust the flight plan based on the area of high heat to avoid thermal damage to the UAV by the UAV moving at least a defined distance away from the structure; and responsive to the adjustment, navigate the UAV according to the adjusted flight plan.

2. The system of claim 1, wherein the instructions, when executed by the one or more processors, cause the one or more processors to:

obtain a heat map corresponding to an area around a target object associated with the structure, wherein the flight plan is dynamically adjusted based on high heat values as indicated in the heat map.

3. The system of claim 1, wherein the instructions, when executed by the one or more processors, cause the one or more processors to:

based on the plurality of ambient temperature values, generate a heat map corresponding to an area surrounding a target object associated with the structure, wherein the heat map includes a plurality of three-dimensional locations in a volumetric space around the target object, and wherein each of the three-dimensional locations is mapped to a respective ambient temperature value of the plurality of ambient temperature values.

4. The system of claim 1, wherein the instructions, when executed by the one or more processors, cause the one or more processors to:

prevent navigation of the UAV to a position corresponding to a stored geospatial location based on the ambient temperature value corresponding to the stored geospatial location.

5. The system of claim 1, wherein the instructions to navigate the UAV according to the flight plan, when executed by the one or more processors, cause the one or more processors to:

navigate the UAV according to the flight plan in an auto-piloted mode, wherein the flight plan includes a plurality of waypoints, wherein the one or more processors are configured to execute the instructions to:

determine whether a particular waypoint in the flight plan coincides with an area in which the safe ambient temperature threshold is exceeded; and remove the particular waypoint from the flight plan so that the UAV avoids the area.

6. The system of claim 1, wherein the instructions, when executed by the one or more processors, cause the one or more processors to:

determine a contingency event based on a detection of an ambient temperature above the safe ambient temperature threshold; and conduct a contingency maneuver by the UAV in response to the determined contingency event.

7. The system of claim 1, wherein the instructions to navigate the UAV according to the flight plan, when executed by the one or more processors, cause the one or more processors to:

navigate the UAV according to the flight plan in an auto-piloted mode, wherein the flight plan includes a plurality of waypoints associated with the inspection of the structure, wherein, to dynamically adjust the flight plan to avoid thermal damage to the UAV, the one or more processors are configured to execute the instructions to:

adjust the flight plan to navigate the UAV to a location in a direction away from the structure until the ambient temperature is within an allowable temperature range.

8. The system of claim 1, wherein the instructions to navigate the UAV according to the flight plan, when executed by the one or more processors, cause the one or more processors to:

navigate the UAV according to the flight plan in an auto-piloted mode, wherein the flight plan includes a plurality of waypoints associated with the inspection of the structure, wherein the one or more processors are configured to execute the instructions to:

determine using an ambient light sensor that light ambient to the UAV is below a threshold level; and cause the UAV to move to the next waypoint if the ambient light is below the threshold level.

9. The system of claim 1, wherein the instructions, when executed by the one or more processors, cause the one or more processors to:

periodically monitor a temperature of one or more internal components of the UAV, wherein, if the temperature of the one or more internal components reaches a threshold value, to dynamically adjust the flight plan to avoid thermal damage to the UAV, the one or more processors are configured to execute the instructions to:

automatically navigate the UAV to a location where the temperature of the one or more internal components begins to reduce.

10. The system of claim 1, wherein the instructions to navigate the UAV according to the flight plan, when executed by the one or more processors, cause the one or more processors to:

navigate the UAV around the structure based on the flight plan, wherein the flight plan is based at least in part on a safe stand-off distance from the structure to avoid thermal damage to UAV; and while navigating around the structure, obtain by the UAV sensor data describing the structure.

11. A method implemented by a system comprising one or more processors, the method comprising:

navigating an unmanned aerial vehicle (UAV) according to a flight plan for inspecting a structure which generates heat;

while navigating the UAV according to the flight plan:

periodically monitoring ambient temperature external to the UAV;

storing a plurality of ambient temperature values and respective geospatial locations of where the ambient temperature was monitored;

processing the plurality of ambient temperature values and the respective geospatial locations to determine an area of high heat exceeding a safe ambient temperature threshold defined for the UAV along the structure; and dynamically adjusting the flight plan based on the area of high heat to avoid thermal damage to the UAV; and responsive to the adjusting, navigating the UAV according to the adjusted flight plan.

12. The method of claim 11, the method further comprising:

obtaining a heat map corresponding to an area around a target object, wherein the flight plan is dynamically adjusted based on high heat values as indicated in the heat map.

13. The method of claim 11, the method further comprising:

based on the plurality of ambient temperature values, generating a heat map corresponding to an area surrounding a target object, wherein the heat map includes a plurality of three-dimensional locations in a volumetric space around the target object, where each of the three-dimensional locations is mapped to a respective ambient temperature value of the plurality of ambient temperature values.

14. The method of claim 11, the method further comprising:

preventing navigation of the UAV to a position corresponding to a stored geospatial location based on the ambient temperature value corresponding to the stored geospatial location.

15. The method of claim 11, wherein navigating the UAV according to the flight plan comprises:

navigating the UAV according to the flight plan in an auto-piloted mode, wherein the flight plan includes a plurality of waypoints, the method further comprising:

determining whether a particular waypoint in the flight plan coincides with an area in which the safe ambient temperature threshold is exceeded; and removing the particular waypoint from the flight plan so that the UAV avoids the area.

16. The method of claim 11, the method further comprising:

determining a contingency event based on a detection of an ambient temperature above the safe ambient temperature threshold; and conducting a contingency maneuver by the UAV in response to the determined contingency event.

17. The method of claim 11, wherein navigating the UAV according to the flight plan comprises:

navigating the UAV according to the flight plan in an auto-piloted mode, wherein the flight plan includes a plurality of waypoints associated with the inspection of the structure, wherein dynamically adjusting the flight plan to avoid thermal damage to the UAV comprises:

adjusting the flight plan to navigate the UAV to a location in a direction away from the structure until the ambient temperature is within an allowable temperature range.

18. The method of claim 11, wherein navigating the UAV according to the flight plan comprises:

navigating the UAV according to the flight plan in an auto-piloted mode, wherein the flight plan includes a plurality of waypoints associated with the inspection of the structure, the method further comprising:

determining using an ambient light sensor that light ambient to the UAV is below a threshold level; and causing the UAV to move to the next waypoint if the ambient light is below the threshold level.

19. The method of claim 11, the method further comprising:

periodically monitoring a temperature of one or more internal components of the UAV, wherein, if the temperature of the one or more internal components reaches a threshold value, dynamically adjusting the flight plan to avoid thermal damage comprises:

automatically navigating the UAV to a location where the temperature of the one or more internal components begins to reduce.

20. The method of claim 11, wherein navigating the UAV according to the flight plan comprises:

navigating the UAV around the structure based on the flight plan, wherein the flight plan is based at least in part on a safe stand-off distance from the structure to avoid thermal damage to UAV; and while navigating around the structure obtaining by the UAV sensor data describing the structure.

21. A non-transitory computer storage medium comprising instructions that when executed by a system comprising one or more processors, cause a performance of operations comprising:

navigating an unmanned aerial vehicle (UAV) according to a flight plan for inspecting a structure which generates heat;

while navigating the UAV, according to the flight plan:

periodically monitoring ambient temperature external to the UAV to determine a plurality of ambient temperature values;

processing the plurality of ambient temperature values and respective geospatial locations of where the ambient temperature was monitored to determine an area of high heat exceeding a safe ambient temperature threshold defined for the UAV along the structure;

dynamically adjusting the flight plan based on the area of high heat to avoid thermal damage to the UAV; and responsive to the adjusting, navigating the UAV according to the adjusted flight plan.

22. The non-transitory computer storage medium of claim 21, wherein the operations further comprise:

obtaining a heat map corresponding to an area around a target object, wherein the flight plan is dynamically adjusted based on high heat values as indicated in the heat map.

23. The non-transitory computer storage medium of claim 21, wherein the operations further comprise:

based on the plurality of ambient temperature values, generating a heat map corresponding to an area surrounding a target object, wherein the heat map includes a plurality of three-dimensional locations in a volumetric space around the target object, where each of the three-dimensional locations is mapped to a respective ambient temperature value of the plurality of ambient temperature values.

24. The non-transitory computer storage medium of claim 21, wherein the operations further comprise:

storing the plurality of ambient temperature values and respective locations of where the ambient temperature was monitored; and preventing navigation of the UAV to a position corresponding to a stored geospatial location based on the ambient temperature value corresponding to the stored geospatial location.

25. The non-transitory computer storage medium of claim 21, wherein the navigating the UAV according to the flight plan comprises:

navigating the UAV according to the flight plan in an auto-piloted mode, wherein the flight plan includes a plurality of waypoints, wherein the operations further comprise:

determining whether a particular waypoint in the flight plan coincides with an area in which the safe ambient temperature threshold is exceeded; and removing the particular waypoint from the flight plan so that the UAV avoids the area.

26. The non-transitory computer storage medium of claim 21, wherein the operations further comprise:

determining a contingency event based on a detection of an ambient temperature above the safe ambient temperature threshold; and conducting a contingency maneuver by the UAV in response to the determined contingency event.

27. The non-transitory computer storage medium of claim 21, wherein the navigating the UAV according to the flight plan comprises:

navigating the UAV according to a flight plan in an auto-piloted mode, wherein the flight plan includes a plurality of waypoints associated with inspection of the structure, wherein dynamically adjusting the flight plan to avoid thermal damage to the UAV comprises:

adjusting the flight plan to navigate the UAV to a location in a direction away from the structure until the ambient temperature is within an allowable temperature range.

28. The non-transitory computer storage medium of claim 21, wherein the navigating the UAV according to the flight plan comprises:

navigating the UAV according to a flight plan in an auto-piloted mode, wherein the flight plan includes a plurality of waypoints associated with the inspection of the structure, wherein the operations further comprise:

determining using an ambient light sensor that light ambient to the UAV is below a threshold level; and causing the UAV to move to the next waypoint if the ambient light is below the threshold level.

29. The non-transitory computer storage medium of claim 21, wherein the operations further comprise:

periodically monitoring a temperature of one or more internal components of the UAV, wherein, if the temperature of the one or more internal components reaches a threshold value, dynamically adjusting the flight plan to avoid thermal damage to the UAV comprises:

automatically navigating the UAV to a location where the temperature of the one or more internal components begins to reduce.

30. The non-transitory computer storage medium of claim 21, wherein the navigating the UAV according to the flight plan comprises:

navigating the UAV around the structure based on the flight plan, wherein the flight plan is based at least in part on a safe stand-off distance from the structure to avoid thermal damage to UAV; and while navigating around the structure, obtaining by the UAV sensor data describing the structure.

* * * * *